(12) United States Patent
Akiyama

(10) Patent No.: US 8,049,840 B2
(45) Date of Patent: Nov. 1, 2011

(54) DOUBLE-SIDED DISPLAY APPARATUS

(75) Inventor: Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 697 days.

(21) Appl. No.: 11/660,370

(22) PCT Filed: Aug. 17, 2005

(86) PCT No.: PCT/JP2005/015302
§ 371 (c)(1),
(2), (4) Date: Feb. 16, 2007

(87) PCT Pub. No.: WO2006/019174
PCT Pub. Date: Feb. 23, 2006

(65) Prior Publication Data
US 2007/0206137 A1    Sep. 6, 2007

(30) Foreign Application Priority Data
Aug. 17, 2004   (JP) .................................. 2004-237052

(51) Int. Cl.
*G02F 1/1347* (2006.01)
*G02F 1/1335* (2006.01)
(52) U.S. Cl. .............................. 349/74; 349/65; 349/114
(58) Field of Classification Search .................... 349/65, 349/74, 114; 362/632–634
See application file for complete search history.

(56) References Cited

U.S. PATENT DOCUMENTS
| | | | |
|---|---|---|---|
| 7,123,318 B2 * | 10/2006 | Nagakubo et al. | 349/74 |
| 2004/0136155 A1 * | 7/2004 | Onishi et al. | 361/683 |
| 2005/0073627 A1 | 4/2005 | Akiyama | |

FOREIGN PATENT DOCUMENTS
| | | |
|---|---|---|
| JP | 1-265289 | 10/1989 |
| JP | 07-301829 A | 11/1995 |
| JP | 08-254719 | 10/1996 |
| JP | 2001-075087 | 3/2001 |
| JP | 2004-45727 | 2/2004 |
| JP | 2004-46050 | 2/2004 |
| JP | 2004-126196 | 4/2004 |
| WO | WO 03/029884 A1 | 4/2003 |

* cited by examiner

*Primary Examiner* — Nathanael R Briggs
(74) *Attorney, Agent, or Firm* — Finnegan, Henderson, Farabow, Garrett & Dunner, L.L.P.

(57) ABSTRACT

The object of the invention is to provide a display apparatus that can partially eliminate the need for a backlight unit and that achieves a corresponding reduction in thickness. The display apparatus includes two display panels arranged one on top of the other and each having two transparent substrates disposed opposite each other with a liquid crystal layer provided therebetween, and the first display panel has a reflective layer, a light-guiding transparent substrate, and a light control layer, and the second transparent substrate, reflective layer, light control layer, and light source together constitute an illuminating means for illuminating the second display panel which is an illuminated member, with provisions made to illuminate the second display panel by the light emerging from the light-guiding transparent substrate.

11 Claims, 18 Drawing Sheets

PRIOR ART

DOUBLE-SIDED DISPLAY APPARATUS

FIELD OF THE INVENTION

The present invention relates to a display apparatus that uses an electro-optical conversion material and, more particularly, to a double-sided display apparatus in which two display panels are arranged back to back relative to each other so that each display panel can present a display for viewing by the viewer.

The electro-optical conversion material used in the present invention is not limited to liquid crystal materials, but other electro-optical conversion materials may be used, and the invention is applicable to a display apparatus having a display panel constructed by sandwiching such an electro-optical conversion material between two opposing substrates; preferably, the substrate having the function of guiding light, to be described herein, is at least transparent in itself, but use may be made of a substrate that has a somewhat lower transparency or is translucent or has a light diffusing function.

BACKGROUND OF THE INVENTION

The use of liquid crystal displays has been rapidly increasing in a variety of fields as low-power, thin and light-weight displays. In particular, in the mobile phone field which has seen an explosive growth in recent years, every mobile unit is equipped with a liquid crystal display.

In mobile phones, reflective liquid crystal displays are often employed because of their low power consumption in order to extend battery life. Most of them are transflective liquid crystal displays equipped with backlighting. Since liquid crystal displays are not self-luminous displays, the backlight is used to enhance visibility in a low-light environment where a sufficient amount of ambient light is not available for viewing the screen.

In recent years, as information communications such as electronic mail develop, the screen size of the liquid crystal display has been increasing and, as a result, the size of the mobile phone also has been increasing. In view of this, folding mobile phones have been developed that offer the advantage of being able to protect the display screen as well as the advantage of enhancing the portability.

Since this type of mobile phone is usually folded up when not in use, the user has had to unfold the phone each time he or she wants to check the current time or to check for an incoming call. To eliminate such inconvenience, recent mobile phones have come to be equipped with, in addition to a first liquid crystal display which is viewed with the mobile phone unfolded, a second liquid crystal display which is mounted in a position where the display can be viewed with the mobile phone folded up, thus enabling the user to check various kinds of information displayed thereon anytime he or she desires.

FIG. 16 is a diagram showing an example of the construction of a commonly used mobile phone.

The mobile phone 1000 comprises a main body 1100 and a cover 1200 joined together by a hinge 1300 in such a manner that the cover can be turned to open and close relative to the main body. A keypad 1109 is provided on the top of the main body 1100, and a first liquid crystal display 1101 and a second liquid crystal display 1102 are mounted in the cover 1200 in a back-to-back arrangement thus forming a double-sided display apparatus.

The first liquid crystal display 1101 comprises a first display panel 1103 and a first backlight 1104, and the second liquid crystal display 1102 comprises a second display panel 1105 and a second backlight 1106. A first windshield 1107 and a second windshield 1108 are provided on the casing of the cover 1200, the former on the inside (the right side in the figure) and the latter on the outside (the left side in the figure), in order to allow the respective display panels 1103 and 1105 to be viewed therethrough.

The display functions of the mobile phone 1000 shown in FIG. 16 will be described. When the user uses the mobile phone 1000, the user opens the cover 1200 folded over the main body 1100 by turning the cover 1200 in the direction indicated by arrow. In this case, the first display panel 1103 produces the display, and the first backlight 1104 is turned on. At this time, the second display panel 1105 also produces a display, but the second backlight 1106 is off. In this condition, the user can operate the keypad 1109 on the main body 1100 while viewing the display produced on the first liquid crystal display 1101.

When folding up the mobile phone 1000 for portability, the user turns the cover 1200 in the direction opposite to the direction of the arrow and thus folds it over the main body 1100. Thereupon, the display on the first display panel 1103 turns off, and the first backlight 1104 also turns off. On the other hand, the display on the second display panel 1105 remains on, and the second backlight 1106 now turns on. The second backlight 1106, however, turns off several tens of seconds after that. The second backlight 1106 also turns on when an incoming call arrives or when the user operates a key or the like.

FIG. 17 is a diagram schematically showing another prior art liquid crystal display apparatus (see patent document 1).

In the liquid crystal display apparatus shown in FIG. 17, a light source 58 as a backlight 51 and a light-guide member 49 are provided between a first display panel 40 and a second display panel 50.

The first display panel 40 is a monochrome transflective liquid crystal display. A liquid crystal layer 44 is sealed between a transparent front substrate 41 and a transparent rear substrate 42 by means of a seal member 43. A transflective film 45 is provided on the surface of the transparent rear substrate 42 that faces the liquid crystal layer 44, and a polarizer 46 is provided on the front surface of the transparent front substrate 41.

The second display panel 50 is a transmissive color liquid crystal display. A liquid crystal layer 55 is sealed between a transparent front substrate 52 and a transparent rear substrate 53 by means of a seal member 54. Color filters 56 are provided on the surface of the transparent rear substrate 53 that faces the liquid crystal layer 55, and polarizers 57 and 58 are provided on the front surface of the transparent front substrate 52 and the back surface of the transparent rear substrate 53, respectively.

In FIG. 17, electrodes and alignment films or insulating films (or planarizing films) are provided on the liquid crystal sides of the respective substrates.

In FIG. 17, external light S incident on the first display panel 40 passes through the polarizer 46, the liquid crystal layer 44, etc. and is reflected by the transflective film 45; the reflected light passes through the liquid crystal layer 44 and through the polarizer 46 for viewing by the viewer. In this way, the first display panel 40 functions as a reflective liquid crystal display.

On the other hand, when the backlight 51 is turned on, the light from the backlight, when directed toward the first display panel, passes through the light-guide member 49, the transflective film 45, and the liquid crystal layer 44, and is thus viewed as light S' by the viewer.

The second display panel 50 is a transmissive color liquid crystal display. When the backlight 51 is turned on, the light S1 directed in the direction of the second display panel 50 travels in that direction to provide a light source for the second display panel 50. The light directed in the direction of the first display panel 40 passes through the transparent substrate 42 of the first display panel 40, but a portion of the light here is reflected by the transflective film of the first display panel 40 back into the direction of the second display panel 50 to provide a light source for the second display panel 50. On the other hand, the remaining light that passed through the transflective film is blocked by the liquid crystal layer 44 and does not reach the viewer. In this way, half of the light emitted from the backlight 51 is used as the light source for the second display panel 50.

FIG. 18 is a diagram schematically showing still another prior art liquid crystal display apparatus (see patent document 2).

The liquid crystal display apparatus shown in FIG. 18 comprises a liquid crystal panel 64 which is constructed by sealing the outer peripheral edges of a first transparent substrate 60 and second transparent substrate 61 by a seal member 62, with a liquid crystal material, as a liquid crystal layer 63, sandwiched therebetween.

An integrated circuit 65 for driving the liquid crystal display is connected, via an anisotropic conductive layer 67 containing conductive particles 66, to the underside of the first transparent substrate 60 at a position outwardly to the right of the seal member 62 as seen in the figure. A light control layer 68 is formed on the viewer side (the upper side in the figure) of the first transparent substrate 60. The light control layer 68 is formed over the entire area on the surface of the first transparent substrate 60 except the portion thereof to which the integrated circuit 65 is connected.

A first polarizing member 71 comprising a first polarizer 69 and a retardation film 70 is disposed above the light control layer 68. An internal reflective layer 72 is formed on the surface of the second transparent substrate 61 that faces the liquid crystal layer 63. A light source 73 is disposed in such a manner as to closely contact the left end face of the first transparent substrate 60 via a second polarizer 74 and a second retardation film 75.

In the structure of FIG. 18, the first transparent substrate 60 is formed thicker than the second transparent substrate 61. The first transparent substrate 60, on the upper surface of which the light control layer 68 having projections and depressions is formed, is attached to the first polarizing member 74 by means of a attaching member 76 on the light control layer 68.

Patent document 1: Japanese Unexamined Patent Publication No. 2004-45727

Patent document 2: Japanese Unexamined Patent Publication No. 2001-75087

SUMMARY OF THE INVENTION

In the case of the mobile phone 1000 shown in FIG. 16, the thickness of the first display panel 1103 is 1.5 mm, and the thickness of the first backlight 1104 is 1 mm, the combined thickness being 2.5 mm. The second liquid crystal display 1102 is essentially identical in structure to the first liquid crystal display 1101, and therefore has substantially the same thickness. As a result, when the two liquid crystal displays are placed back to back, the total thickness is about 5 mm. With the thickness of the support frame, etc. further added, the entire structure of the mobile phone becomes very thick. There has therefore been the problem that when the two liquid crystal displays 1101 and 1102 are arranged back to back, the thickness of the mobile phone increases, impairing the portability of the mobile unit.

In this way, the prior art liquid crystal display apparatus capable of providing displays on both sides has had the problem that the portability is impaired because of the increased thickness of the backlight mounting portion.

In the liquid crystal display apparatus shown in FIG. 17, which comprises the first display panel 40 and the second display panel 50, a single backlight unit 51 is used to illuminate both the first display panel 40 and the second display panel 50. On the other hand, in the liquid crystal display apparatus shown in FIG. 18, the light control layer 68 is formed on the viewer side of the first transparent substrate, and the first polarizing member is disposed above the light control layer 68.

It is an object of the present invention to propose a display apparatus for improving the above prior art problems.

It is also an object of the present invention to provide a display apparatus having an extremely thin construction despite the provision of two display panels in a back-to-back arrangement.

It is a further object of the present invention to provide a display apparatus in which one display panel includes an illuminating means for illuminating the other display panel, thereby eliminating the need for a backlight unit and thus achieving a reduction in thickness.

A display apparatus according to the present invention includes a first display panel having a transparent substrate and a reflective layer, a second display panel, and a light source, wherein light emitted from the light source and introduced into the transparent substrate of the first display panel is reflected by the reflective layer of the first display panel and illuminates the second display panel.

Preferably, the display apparatus according to the present invention further includes a light control layer provided on the transparent substrate of the first display panel on a side thereof facing the second display panel, and is constructed so that the light emitted from the light source and introduced into the transparent substrate is reflected by the reflective layer and illuminates the second display panel via the light control layer.

Preferably, in the display apparatus according to the present invention, the light control layer is attached directly to the transparent substrate.

Preferably, in the display apparatus according to the present invention, the light control layer is integrally formed with the transparent substrate.

Preferably, in the display apparatus according to the present invention, the light control layer is approximately equal in size to the display area of the second display panel.

Preferably, the display apparatus according to the present invention further includes a prism sheet disposed between the light control layer and the second display panel.

Preferably, in the display apparatus according to the present invention, further includes a second transparent substrate, wherein the first display panel is a liquid crystal display panel having a first liquid crystal layer provided between the first transparent substrate and the second transparent substrate, and the reflective layer is disposed between the first liquid crystal layer and the transparent substrate.

Preferably, the display apparatus according to the present invention further comprises a front light, disposed outside the second transparent substrate, for illuminating the first liquid crystal panel.

Preferably, in the display apparatus according to the present invention, the first display panel is an organic EL display, a microencapsulated electrophoretic (MAIKUROKAPUSERUGATA-DENKIYUDO) display, an electro liquid powder (DENKIFUNRYUTAI) display, or an electron-emission display.

Preferably, in the display apparatus according to the present invention, the light source is disposed adjacent to an end face of the transparent substrate.

Preferably, in the display apparatus according to the present invention, the second display panel is a liquid crystal display panel having a third transparent substrate, a fourth transparent substrate, and a second liquid crystal layer provided between the third and fourth transparent substrates.

Preferably, in the display apparatus according to the present invention, the first display panel and the second display panel are disposed so that the display can be presented for viewing on both sides.

A display apparatus according to the present invention includes
a first liquid crystal display panel having a first transparent substrate, a second transparent substrate, a first liquid crystal layer provided between the first and second transparent substrates, and a reflective layer disposed between the first liquid crystal layer and the second transparent substrate,
a second liquid crystal display panel having a third transparent substrate, a fourth transparent substrate, and a second liquid crystal layer provided between the third and fourth transparent substrates, the second liquid crystal display panel being disposed back to back to the first liquid crystal display panel,
a light control layer which is provided on the second transparent substrate on a side thereof facing the second liquid crystal display panel, and a light source, wherein light emitted from the light source and introduced into the second transparent substrate is reflected by the reflective layer and illuminates the second liquid crystal display panel via the light control layer.

Preferably, the display apparatus according to the present invention further includes a prism sheet disposed between the light control layer and the second liquid crystal display panel.

Preferably, the display apparatus according to the present invention further includes a front light, disposed outside the first transparent substrate, for illuminating the first liquid crystal panel.

Further, a display apparatus according to the present invention includes a display panel having two transparent substrates disposed opposite each other with a liquid crystal provided therebetween, and one or the other of the transparent substrates has a function as a light-guide member for guiding light, and wherein the light introduced into the light-guiding transparent substrate is caused to exit from it without passing through the liquid crystal.

By including in one display panel such an illuminating means for illuminating the other display panel, illuminating light for illuminating the illuminated member can be produced in the display panel itself, without using any backlight device. This obviates the need for a backlight device, and the thickness of the display apparatus can be correspondingly reduced.

Further, in the display apparatus according to the present invention described above, a reflective layer is provided on the liquid crystal layer side of the light-guiding transparent substrate, and the reflective layer reflects the light introduced into the light-guiding transparent substrate and thus causes the light to emerge from the substrate as the illuminating light.

With this arrangement, the light introduced into the light-guiding transparent substrate can be reflected by the reflective layer and caused to emerge from the substrate so that the emergent light can be used as the illuminating light. The illuminated member illuminated with this illuminating light is the other display panel (for example, a sub-display panel) on which various kinds of information are displayed.

Further, in the display apparatus according to the present invention described above, a light control member having projections and depressions for controlling the direction of propagation of the light is provided on the side of the light-guiding transparent substrate opposite from the reflective layer.

With this arrangement, when the light introduced into the light-guiding transparent substrate is reflected by the reflective layer and caused to emerge from the substrate, the direction of propagation of the emergent light can be controlled by the light control member so that the light can be used as the illuminating light for illuminating the intended illuminated member.

Further, in the display apparatus according to the present invention described above, the light control member is directly attached to the light-guiding transparent substrate.

As the control member is directly attached to the light-guiding transparent substrate, the brightness of the illuminating light for the display panel can be increased.

Further, a display apparatus according to the present invention includes two display panels arranged one on top of the other and each having two transparent substrates disposed opposite each other with a liquid crystal provided therebetween, and the transparent substrate of one display panel that is nearer to the other display panel has a function as a light-guide member for guiding light, and wherein the light emerging from the light-guiding transparent substrate illuminates the other display panel.

With this arrangement, the one display panel can, by itself, produce illuminating light for illuminating the other display panel without using any backlight device. In this way, as there is no need to provide a backlight device, the thickness of the display apparatus can be correspondingly reduced.

Further, in the display apparatus according to the present invention described above, a reflective layer is provided on the liquid crystal layer side of the light-guiding transparent substrate, and the reflective layer reflects the light introduced into the light-guiding transparent substrate and thus causes the light to emerge from the substrate as the illuminating light.

With this arrangement, the light introduced into the light-guiding transparent substrate can be reflected by the reflective layer and caused to emerge from the substrate so that the emergent light can be used as the illuminating light for illuminating the other display panel.

Further, in the display apparatus according to the present invention described above, at least one light control member having projections and depressions for controlling the direction of propagation of the light is provided between the light-guiding transparent substrate and the other display panel.

With this arrangement, when the light introduced into the light-guiding transparent substrate is reflected by the reflective layer and caused to emerge from the substrate, the direction of propagation of the emergent light can be controlled by the light control member so that the light can be used as the illuminating light for illuminating the other display panel.

Further, in the display apparatus according to the present invention described above, the area size of the plane surface of the light control member disposed nearest to the light-guiding transparent substrate is made approximately equal to that of the plane surface of the other display panel.

When the other display panel (for example, the sub-display panel) is smaller than the one display panel (for example, the main-display panel), the utilization efficiency of the light for illuminating the other display panel usually drops, because the light exits or leaks out of the light-guiding transparent substrate from the portion thereof where the light control member is not provided. However, with the above arrangement, as the light control member (for example, a prism sheet) is provided so as to substantially cover the display area of the other display panel, the light does not exit from the portion other than the portion corresponding to the light control member, and the light can be utilized effectively. That is, even if the size of the other display panel is smaller than that of the one display panel, since the light does not exit from the portion other than the intended portion, the utilization efficiency of the light for illuminating the other display panel can be enhanced.

Further, in the display apparatus according to the present invention described above, the display area of the one display panel is made larger than that of the other display panel.

With this arrangement, the illuminating light can be projected onto almost the entire display area of the other display panel, thus achieving effective utilization of the light.

Further, in the display apparatus according to the present invention described above, the light control member disposed nearest to the light-guiding transparent substrate is directly attached to the light-guiding transparent substrate.

As the control member is directly attached to the light-guiding transparent substrate of the one display panel, the brightness of the illuminating light for the one display panel can be increased.

Further, in the display apparatus according to the present invention described above, a light source is disposed adjacent to an end face of the light-guiding transparent substrate.

With this arrangement, the light from the light source can be introduced into the light-guiding transparent substrate, reflected by the reflective layer, and caused to emerge from the substrate, and the direction of propagation of the emergent light can be controlled by the light control member so that the light can be used as the illuminating light for illuminating the other display panel.

Further, in the display apparatus according to the present invention described above, a front light that emits illuminating light for illuminating the one display panel is disposed outside the one display panel.

With this arrangement, a display can be produced on the one display panel by illuminating it with the light emitted from the front light, while a display can be produced on the other display panel by illuminating it with the illumination light emitted from the one display panel.

Further, in the display apparatus according to the present invention described above, the front light includes a light-guide member, and a light control layer for controlling the direction of propagation of the light is provided on the surface of the light guide member opposite from the surface thereof that faces the one display panel, while a light source is disposed adjacent to an end face of the light-guide member. Here, the light emitted from the light source and introduced into the light-guide member is reflected by the light control layer and caused to emerge from the light-guide member, and the emergent light is used as the illuminating light.

When the amount of external light is relatively large, the external light incident on the light control layer passes through the light-guide member and enters the one display panel. After that, the light is reflected by the reflective layer and returns to the light control layer on the incident side by taking a path similar to the path it entered, and the light is thus viewed on the viewer side. On the other hand, when the amount of external light is low (in a low-light environment), the light source of the front light is turned on, and the light from the light source enters the light-guide member and is introduced via the light-guide member into the light control layer where the light is reflected by the face of the light control layer; the reflected light then reenters the light-guide member and is introduced into the one display panel. The light is then reflected by the reflective layer and returns to the light control layer on the incident side by taking a path similar to the path it entered, and the light is thus viewed on the viewer side. In this way, the utilization efficiency of the light is enhanced in the above structure.

Further, to achieve the aforementioned object, a display apparatus according to the present invention includes one display panel in which a first transparent substrate having an electrode and a second transparent substrate having an electrode are disposed opposite each other with a liquid crystal layer provided therebetween, and another display panel in which a third transparent substrate having an electrode and a fourth transparent substrate having an electrode are disposed opposite each other with a liquid crystal layer provided therebetween, the one display panel and the other display panel being arranged one on top of the other, wherein the second transparent substrate of the one display panel, which is nearer to the other display panel, is provided with a reflective layer on the liquid crystal layer side thereof, a prism sheet covering at least the display area of the other display panel is disposed on the surface of the second transparent substrate opposite from the reflective layer, and a light source is disposed adjacent to an end face of the second transparent substrate.

In this arrangement, when the light source is turned on, light emitted from the light source enters the second transparent substrate of the one display panel, is reflected by the light reflective layer back into the second transparent substrate, and enters the prism sheet. The light entering the prism sheet is reflected at the interface between the air and the light control layer while changing its angle of emergence, and reenters the second transparent substrate; then, the light is again reflected by the light reflective layer back into the second transparent substrate, and the reflected light passes through the prism sheet, further passes through the third transparent substrate of the other display panel, enters the liquid crystal layer, and passes through the fourth transparent substrate.

Further, to achieve the aforementioned object, a display apparatus according to the present invention includes a display panel constructed by sealing an electro-optical conversion material between two substrates having opposing electrodes, wherein one of the substrates has a function as a light-guide member for guiding light in the display panel, and wherein the light emerging from the light-guiding substrate functioning as the light-guide member is primarily directed to another panel which is disposed separately from the display panel.

Further, a reflective layer is formed on the surface of the light-guiding substrate opposite from the surface thereof that faces the other panel, and the reflective layer reflects the light entering the light-guiding substrate toward the other panel, thereby preventing the light from entering the electro-optical conversion material.

Furthermore, at least one light control member having projections and depressions for controlling the direction of propagation of the light is provided between the light-guiding substrate and the other panel.

Since the one display panel includes the illuminating means as described above, the one display panel can, by itself, produce illuminating light for illuminating the other display panel without using any backlight device. This obviates the need for a backlight device, and the thickness of the display apparatus can be correspondingly reduced.

According to the display apparatus of the present invention, the one display panel which includes the illuminating means can, by itself, produce illuminating light for illuminating the other display panel without using any backlight device. Since there is no need to provide a backlight device, the thickness of the display apparatus can be correspondingly reduced.

Further, according to the display apparatus of the present invention, when the other display panel (for example, the sub-display panel) is smaller than the one display panel (for example, the main-display panel), since the light control member is provided so as to substantially cover the display area of the other display panel, the light does not exit from the portion other than the portion corresponding to the light control member, and the light can be utilized effectively. That is, even if the size of the other display panel is smaller than that of the one display panel, as the light does not exit from the portion other than the intended portion, the utilization efficiency of the light for illuminating the other display panel can be enhanced.

Further, according to the display apparatus of the present invention, a front light that emits illuminating light for illuminating the one display panel is disposed outside the one display panel; with this arrangement, a display can be produced on the one display panel by illuminating it with the light emitted from the front light, while a display can be produced on the other display panel by illuminating it with the illumination light emitted from the one display panel.

DETAILED DESCRIPTION OF THE REFERRED EMBODIMENT

Display apparatus according to the present invention will be described below with reference to the drawings.

Figure 1:
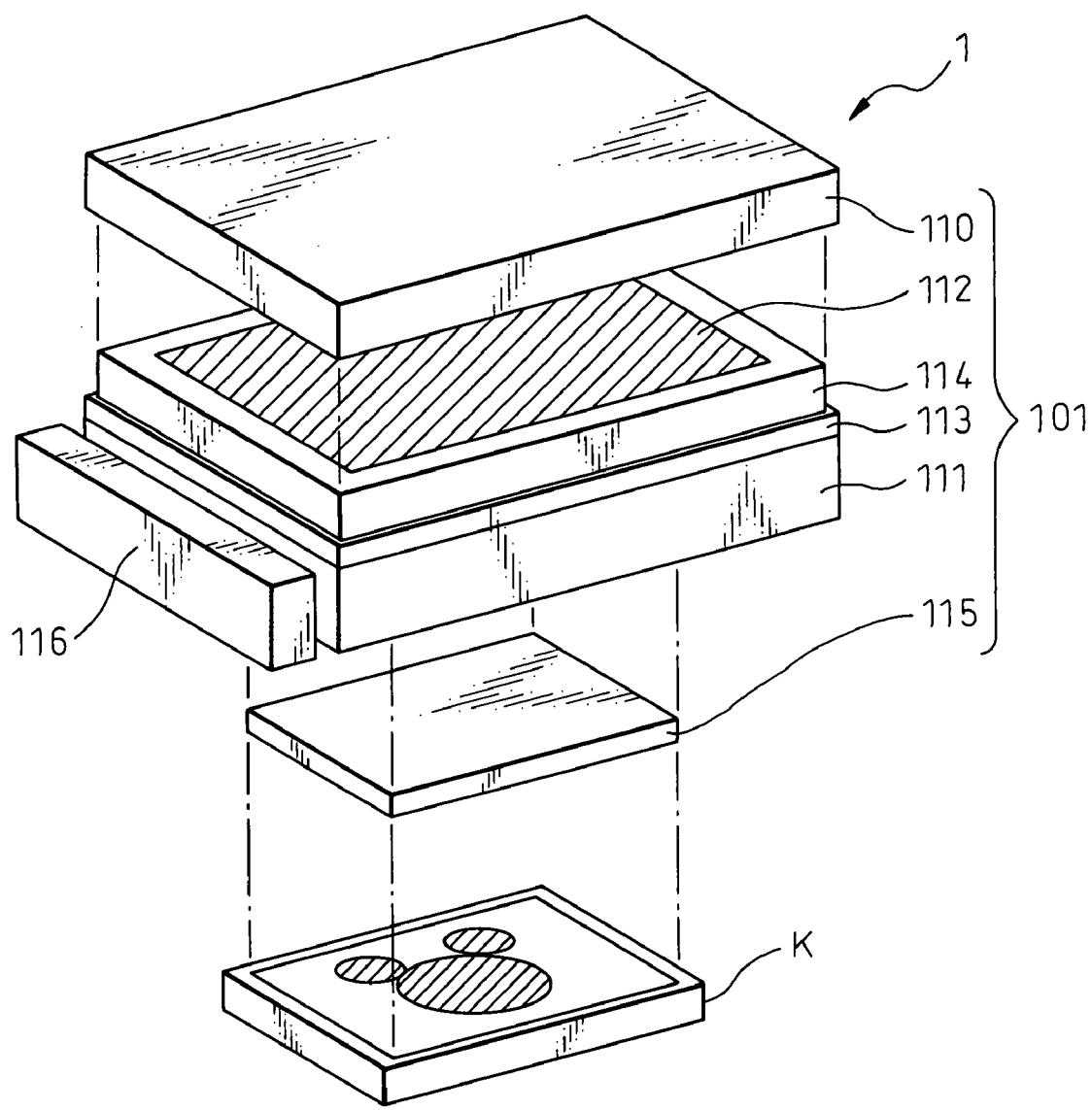
FIG. 1 is a perspective view of a display apparatus according to a first embodiment of the present invention.
Figure 2:
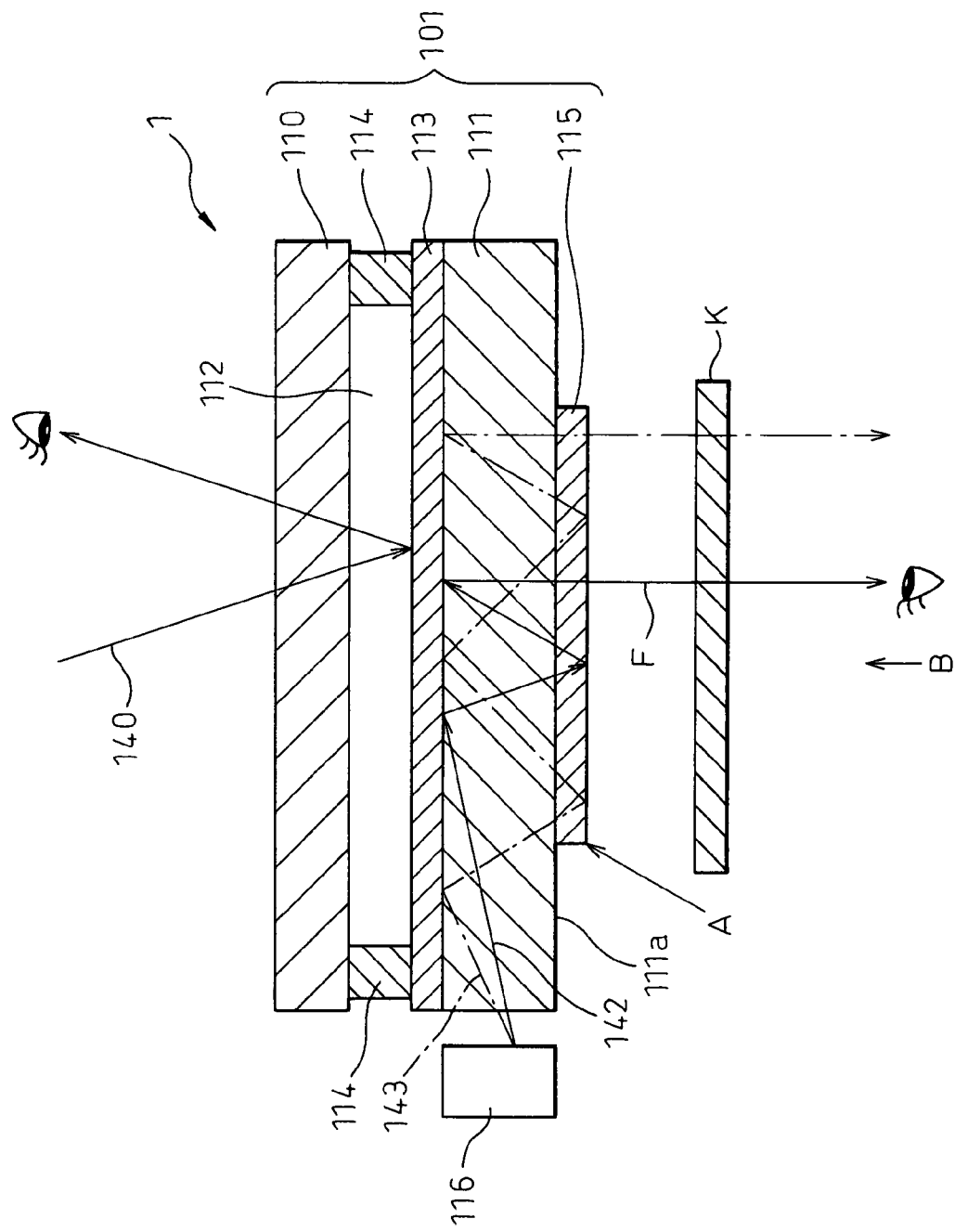
FIG. 2 is a simplified cross-sectional view of the display apparatus shown in FIG. 1.

FIG. 1 is a perspective view of a display apparatus 1 according to a first embodiment of the present invention, and FIG. 2 is a simplified cross-sectional view thereof.

As shown in FIGS. 1 and 2, the display apparatus 1 includes a first display panel 101 and an illuminated member K, such as a display sheet, constructed by drawing letters and pictures on a transmissive film or plate.

The first display panel 101 is a reflective liquid crystal display panel, and comprises a first transparent substrate 110 on the viewer side, a second transparent substrate 111 on the illumination side, and a liquid crystal layer 112. The first transparent substrate 110 is formed from a glass plate on which a first electrode made of a transparent electrode material ITO and an alignment film (neither shown here) are formed. The second transparent substrate 111 is formed from a glass plate on which are formed a reflective layer 113 made of aluminum, a protective layer made of an acrylic-based material (not shown), a second electrode made of a transparent electrode material ITO (in the case of an STN liquid crystal display, electrodes formed in a stripe pattern and, in the case of an active liquid crystal display, active devices and display electrodes) (not shown), and an alignment film deposited on the liquid crystal side of the electrode. The first display panel 101 of the display apparatus 1 shown in FIG. 1 is constructed as an STN liquid crystal display.

Preferably, the reflective layer 113 has an ability to sufficiently reflect the light emitted from a light source 116 and introduced into the second transparent substrate 111, as will be described later. More specifically, it is preferable that the percentage of the light transmitted from the second transparent substrate 111 to the viewer side of the first display panel 101 be held within 10%. This requirement for the characteristic of the reflective layer 113 also applies to other display apparatus 2 to 5 to be described later.

In FIG. 1, the light source 116 is shown as being spaced apart from the second transparent substrate 111. However, it is preferable that the light source 116 be placed in contact with or in close proximity to the second transparent substrate 111 so that there is no spacing left between them (see FIG. 13). This also applied to the drawings hereinafter given.

The first transparent substrate 110 and the second transparent substrate 111 are attached to each other along their peripheries by means of a seal material 114, and the liquid crystal layer 112 is provided between them. A light control layer 115, which is formed from a prism sheet or the like having a function that causes incident light to emerge as light having prescribed directivity, is directly fixed to the second transparent substrate 111.

The area size of the light control layer 115 is approximately equal to that of the display area of the illuminated member K. Accordingly, the second transparent substrate 111 has a portion 111a (see FIG. 3) where the light control layer 115 is not formed.

Figure 4:
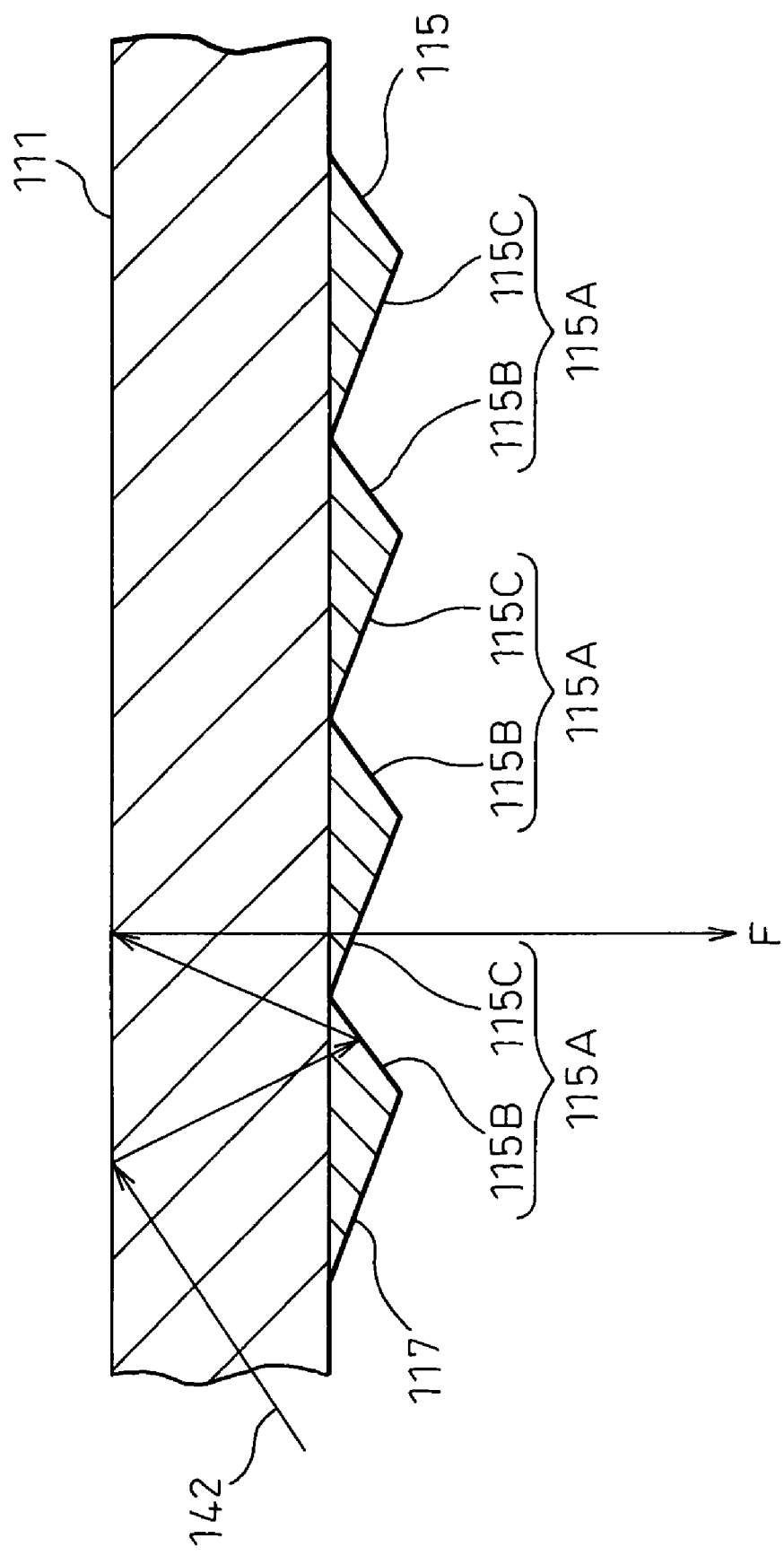
FIG. 4 is an enlarged view of a portion A in the display apparatus shown in FIG. 2, 9, or 11.
Figure 5:
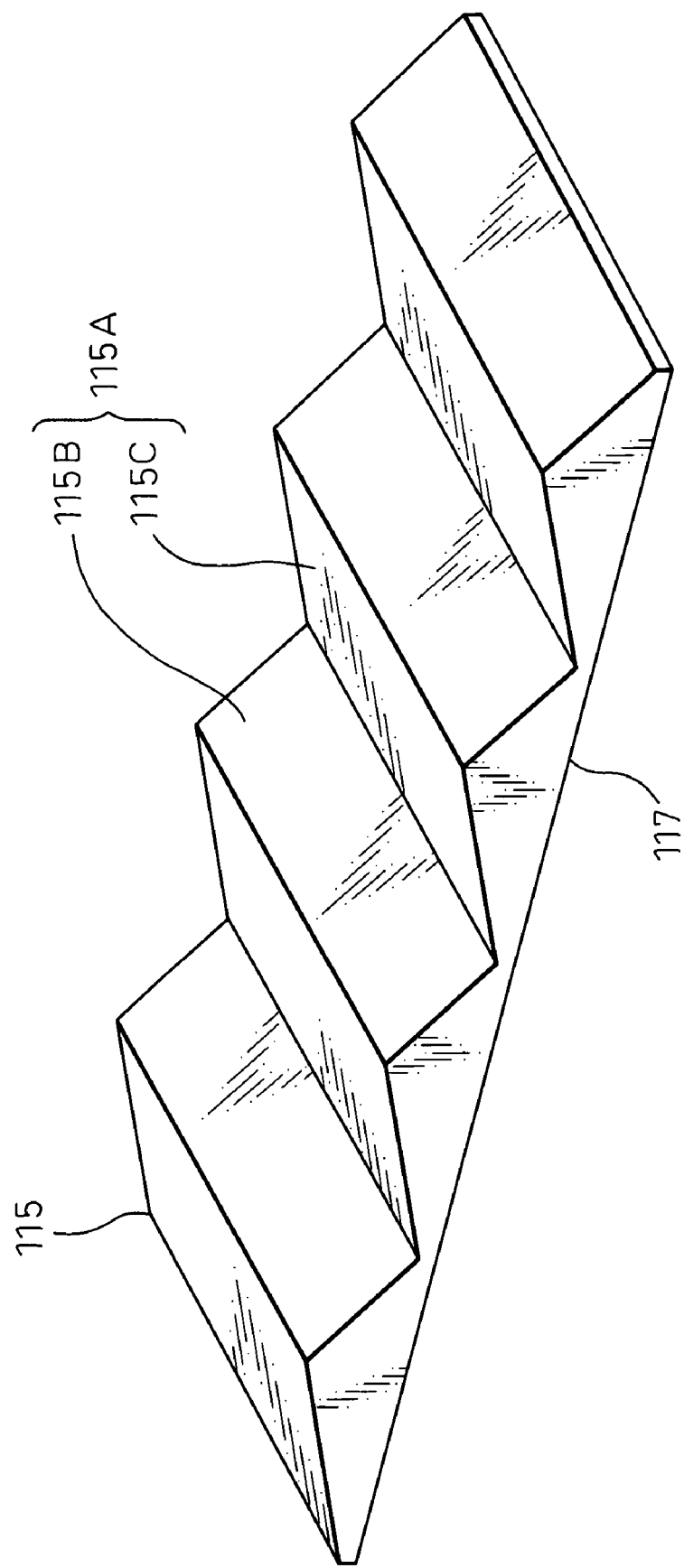
FIG. 5 is a perspective view of a prism sheet forming a light control layer.

As shown in FIGS. 4 and 5, the light control layer 115 is formed by attaching a 100-μm thick prism sheet 117 to the second transparent substrate 111 by means of an acrylic-based adhesive. Grooves 115A, each 20 μm deep, are formed at a pitch of 300 μm on the surface of the prism sheet 117. Each groove 115A is formed in the shape of a scalene triangle, and has two sloping faces 115B and 115C. Here, the prism sheet thickness and the groove depth and pitch are not limited to the above specific values but can be changed to other optimum values as needed. Further, the light control layer 115 may be formed from an acrylic resin or from a diffusing sheet.

As shown in FIG. 2, the light source 116 is disposed in close proximity to an end face of the second transparent substrate 111. The light source 116 is constructed from an array of a plurality of LEDs, and is designed so that the light from the LEDs is directed via a diffusing plate into the second transparent substrate 111 which has a light-guide function. In an alternative design of the light source 116, a linear (square rod-like) light-guide member is placed so as to face the end face of the second transparent substrate 111, LEDs as light sources are disposed adjacent to opposite longitudinal ends of the linear light-guide member, and the light is guided through the linear light guide so that the light emerges from one longitudinal face of the linear light-guide member.

With this design, the light source 116 can project light with a relatively uniform brightness distribution onto the glass end face, and the brightness distribution of the light emergent from the light control layer 115 can be made further uniform.

In the first display panel 101, the second transparent substrate 111 functions as a transparent substrate having a light-guide function. Accordingly, the second transparent substrate 111, the reflective layer 113, the light control layer 115, and the light source 116 together constitute an illuminating means for illuminating the illuminated member K.

Next, the operation of the display apparatus 1 according to the present invention will be described with reference to FIG. 2. In FIG. 2, reference numeral 140 indicates the path of the light provided by an external light source, and 142 and 143 each indicate the path of the light emitted from the light source 116.

The method of display on the first display panel 101 will be described.

When the amount of external light is relatively large, the display can be produced by utilizing the external light. The operation for this case will be described by referring to the external light 140. The external light 140 enters the liquid crystal layer 112 by passing through the first transparent substrate 110 of the first display panel 101. After that, the light is reflected by the reflective layer 113 back into the first transparent substrate 110 on the incident side by taking a path similar to the path it entered.

Here, the first display panel 101 can be set so that, when viewed from the viewer side, the display appears dark (black), for example, when no voltage is applied between the electrodes formed on the first and second transparent electrode substrates 110 and 111. In this case, a bright (white) display state can be produced by applying a voltage between the electrodes from an external circuit so as to cause a potential difference between the electrodes and thereby providing a potential difference between both ends of the liquid crystal layer 112.

Next, the method of display on the illuminated member K will be described.

The light 142 entering the light control layer 115 from the second transparent substrate 111 is reflected by the sloping face 115B of the groove 115A of the light control layer 115 and, with its angle of reflection changed upon reflection, reenters the second transparent substrate 111, as shown in FIGS. 2 and 4. The light 142 is again reflected by the light reflective layer 113, passes through the light control layer 115, and emerges as illuminating light F for illuminating the illuminated member K.

The light 143 in FIG. 2 is the light emitted from the light source 116 and directed toward the light reflective layer 113 formed on the second transparent substrate 111 of the first display panel 101. As shown in FIG. 4, when the light 143 is incident on the sloping face 115C of the groove 115A of the light control layer 115, it is reflected at the sloping face 115B and then reflected by the light reflective layer 113 (see FIG. 2) and emerges in the direction of the illuminated member K. On the first reflection, since the incidence angle of the light 143 is shallow, the light 143 is totally reflected within the second transparent substrate 111 and does not exit from it.

In the display apparatus 1 according to the present invention, when the light source 116 is turned on, light emitted from the light source 116 enters the second transparent substrate 111 of the first display panel 101, is reflected by the light reflective layer 113 back into the second transparent substrate 111, and enters the light control layer 115 (for example, a prism layer or a prism sheet). The light entering the light control layer 115 is reflected at the interface between the air and the light control layer 115 while changing its angle of emergence, and reenters the second transparent substrate 111. The light that reentered the second transparent substrate 111 is again reflected by the light reflective layer 113 back into the second transparent substrate 111, and passes through the light control layer 115 to illuminate the illuminated member K.

Since the first display panel 101 includes the illuminating means as described above, the first display panel 101 can, by itself, produce illuminating light for illuminating the illuminated member K without using any backlight device. In this way, the display apparatus 1 according to the present invention obviates the need for a backlight device, and the thickness of the display apparatus can be correspondingly reduced.

Figure 3:
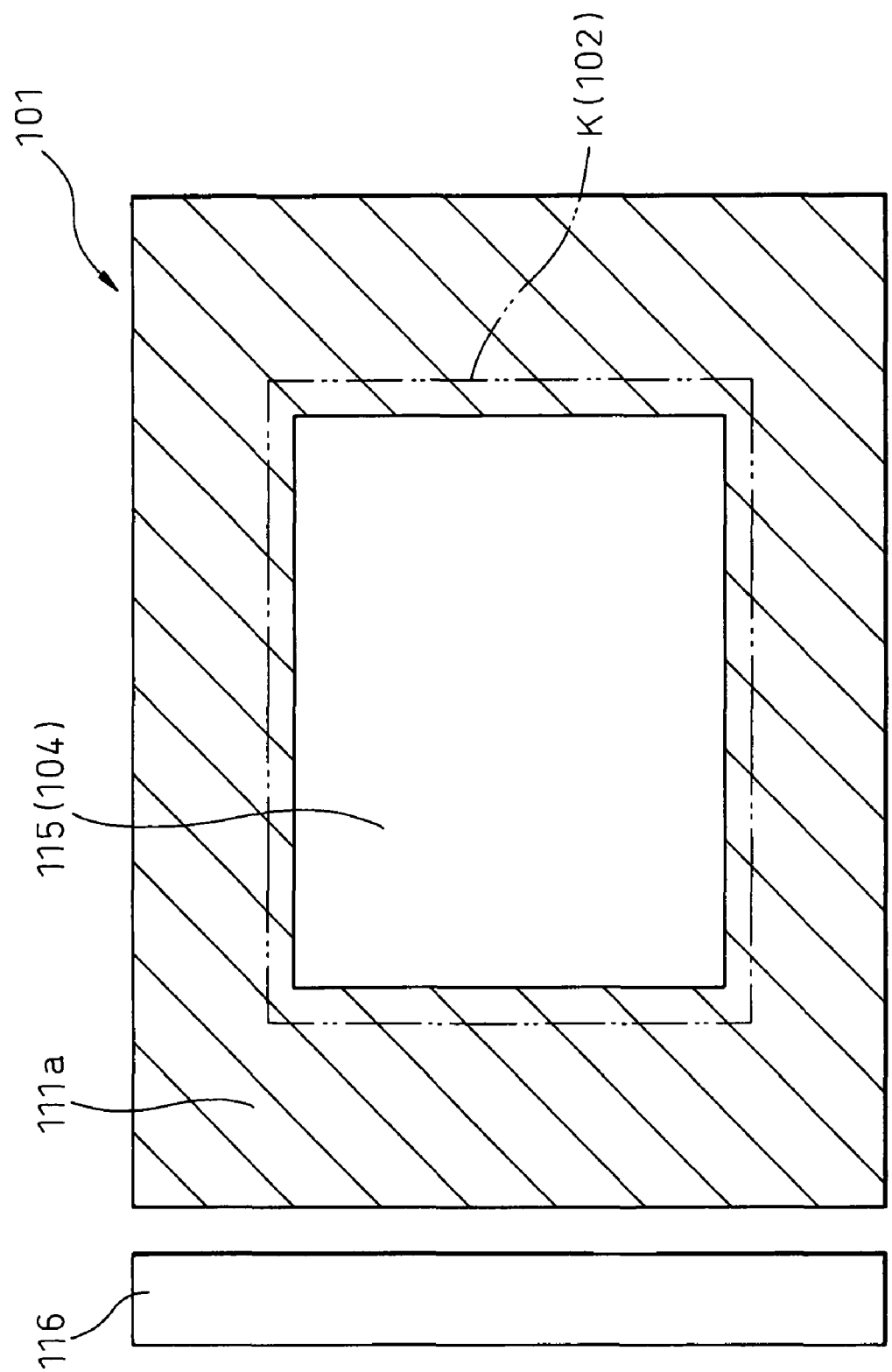
FIG. 3 is a plan view when the display apparatus shown in FIG. 2, 9, or 11 is viewed from direction B.

Further, as can be seen from FIGS. 2 and 3, since the light emitted from the light source 116 and introduced into the second transparent substrate 111 is substantially prevented from exiting from the portion where the light control layer 15 is not formed (the portion 111a not covered by the light control layer 115), the light can be effectively utilized. In other words, even if the size of the illuminated member K is smaller than that of the first display panel 101, since little light exits from the portion other than the portion facing the illuminated member, the utilization efficiency of the light for illuminating the illuminated member K can be enhanced.

The illuminated member K used in the display apparatus 1 according to the present invention is not limited to the display sheet described above, but any other suitable display member such as an advertising panel, a film photo, or a letter or symbol display member can be used.

Figure 6:
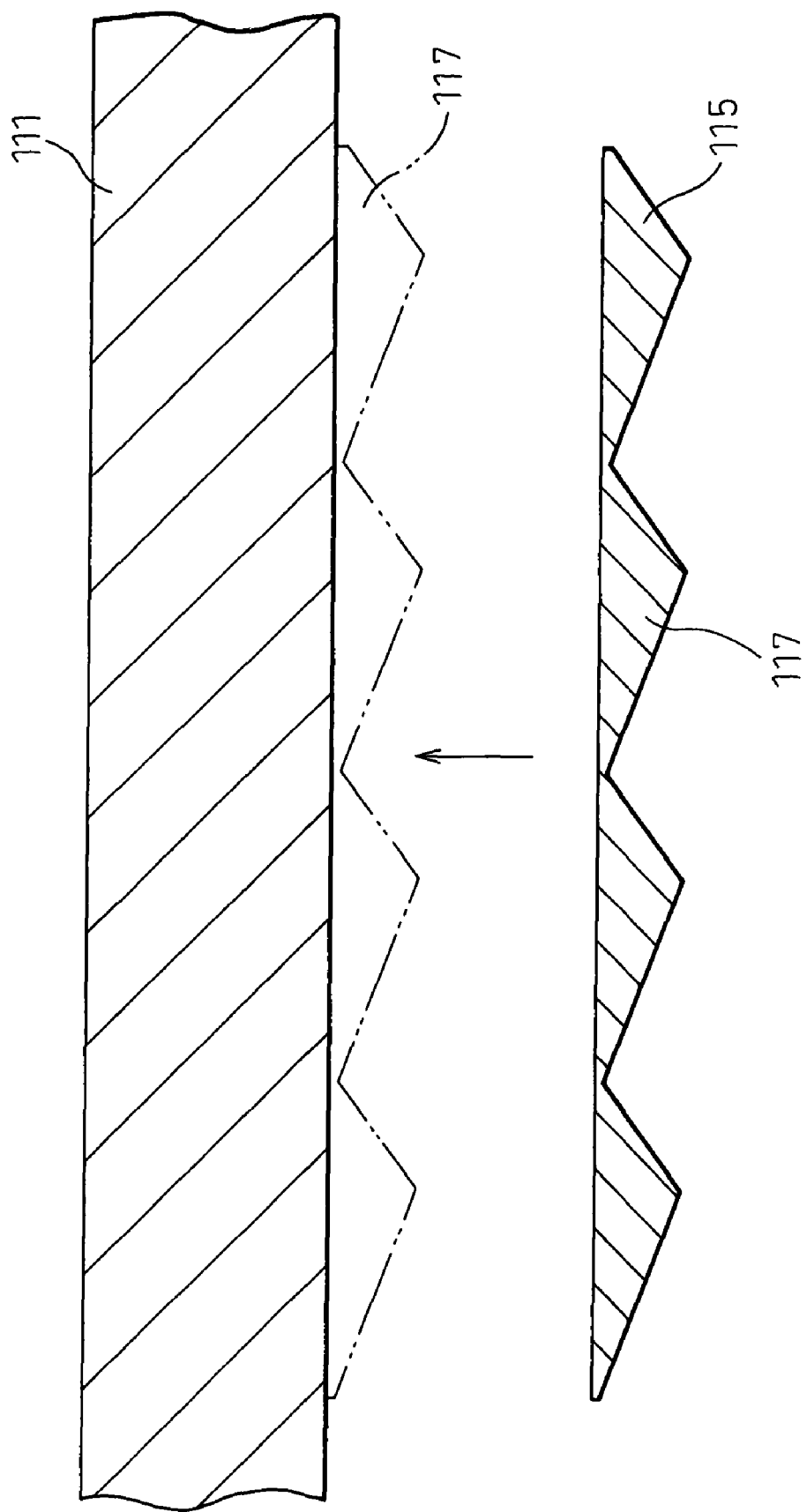
FIG. 6 is a cross-sectional view showing the prism sheet attached to a second transparent substrate.
Figure 7:
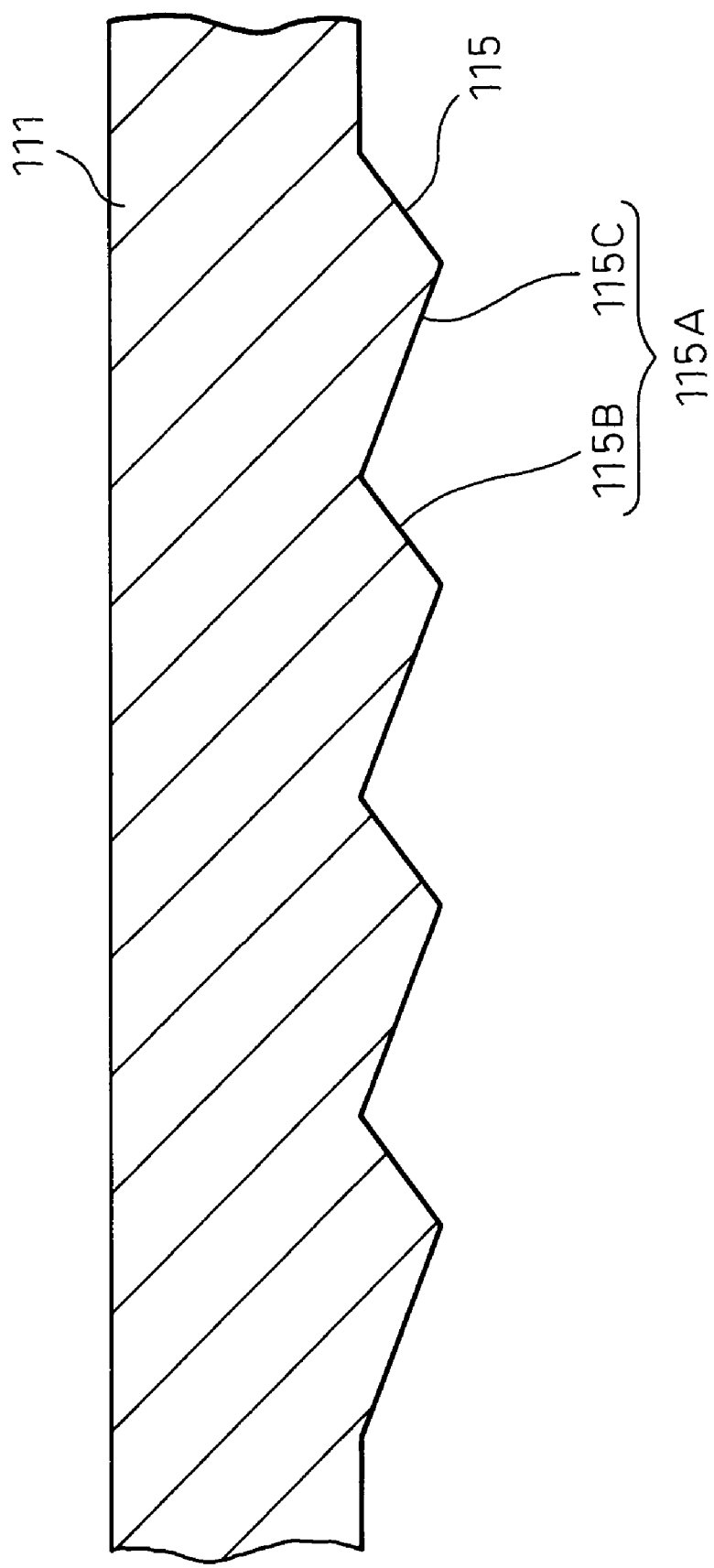
FIG. 7 is a cross-sectional view showing the prism sheet integrally formed with the second transparent substrate.

In the display apparatus 1 according to the present invention, the light control layer 115 has been formed by attaching the prism sheet 117, 100 μm thick, to the second transparent substrate 111 by means of an acrylic-based adhesive, as shown in FIG. 6. Alternatively, as shown in FIG. 7, the light control layer 115 may be formed on the second transparent substrate 111 in integral fashion by using a mold. Further alternatively, the light control layer 115 may be constructed by forming light-scattering projections and depressions on the second transparent substrate 111 (a glass or plastic member) by sand blasting, cutting, etching, or other suitable means.

As described above, the display apparatus 1 according to the present invention includes a display panel (101 in FIG. 1) constructed by sealing an electro-optical conversion material (112 in FIG. 1) between two substrates (110 and 111 in FIG. 1) having opposing electrodes, and the substrate (111 in FIG. 1) has a function as a light-guide member for guiding light, and the light emerging from the light-guiding substrate (111 in FIG. 1) functioning as the light-guide member is primarily directed to another panel (K in FIG. 1) which is disposed separately from the display panel (101 in FIG. 1).

The invention is also characterized in that a reflective layer (113 in FIG. 1) is formed on the surface of the light-guiding substrate (111 in FIG. 1) opposite from the surface thereof that faces the other panel (K in FIG. 1), and in that the reflective layer (113 in FIG. 1) reflects the light (142, 143) entering the light-guiding substrate (111 in FIG. 1) toward the other panel (K in FIG. 1), thereby preventing the light from entering the electro-optical conversion material (112 in FIG. 1).

The invention is further characterized in that at least one light control member (115 in FIG. 1) having projections and depressions for controlling the direction of propagation of the light is provided between the light-guiding substrate and the other panel. Rather than providing only one light control layer 115 as in the display apparatus 1, two, three, or more light control layers can be provided. When providing two light control layers, for example, it is preferable that the lateral edges of the prism forming the first light control layer be oriented at right angles to the lateral edges of the prism forming the second light control layer. Depending on the light control direction (the directivity of light radiation), the lateral edges of the prism forming the first light control layer can be oriented at other than right angles to the lateral edges of the prism forming the second light control layer. When placing the prism forming the first light control layer and the prism forming the second light control layer one on top of the other, it is preferable that the bottom (substantially flat face) of one prism layer be laid over the apex of the other prism layer.

Figure 8:
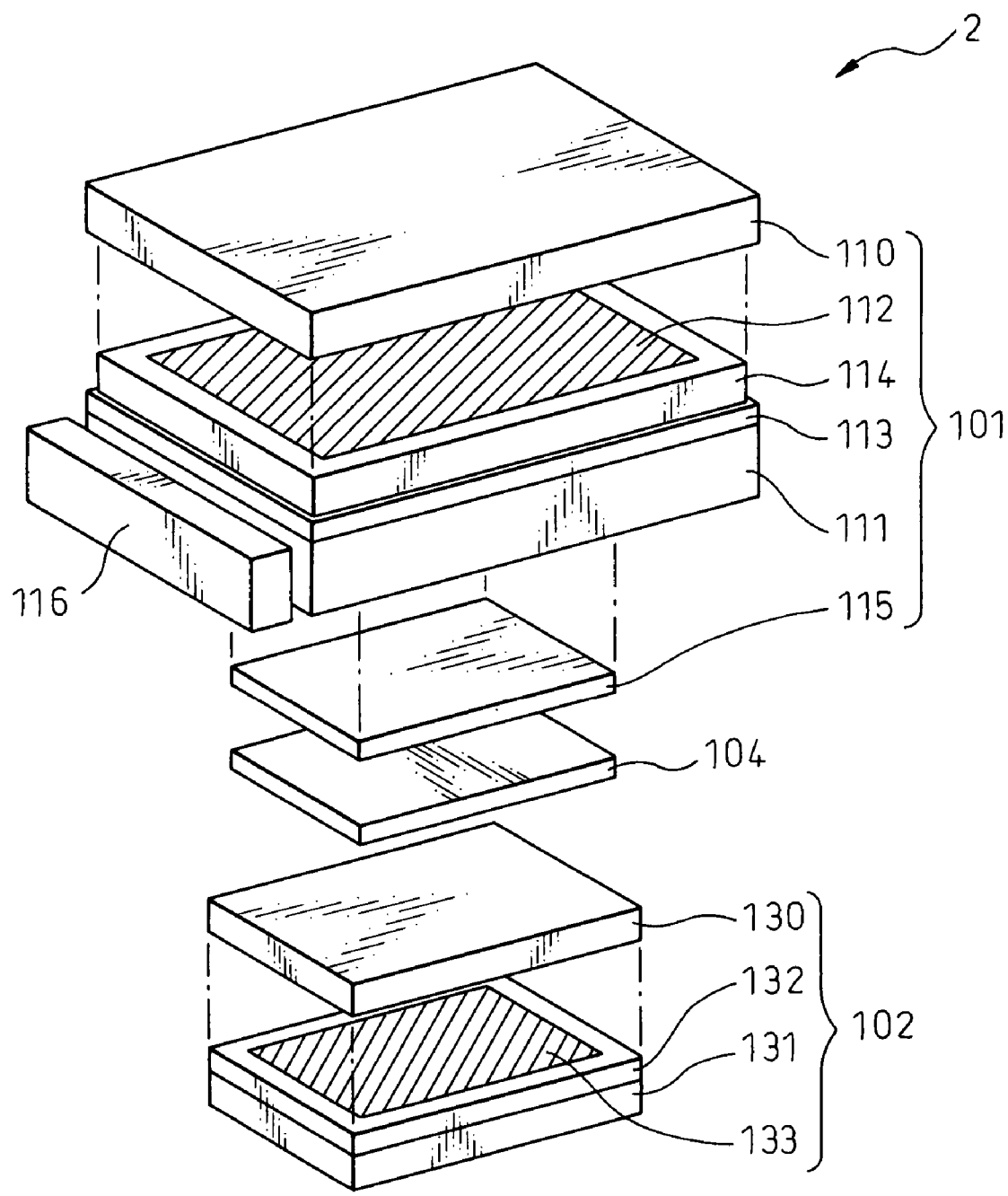
FIG. 8 is a perspective view of a display apparatus according to a second embodiment of the present invention.
Figure 9:
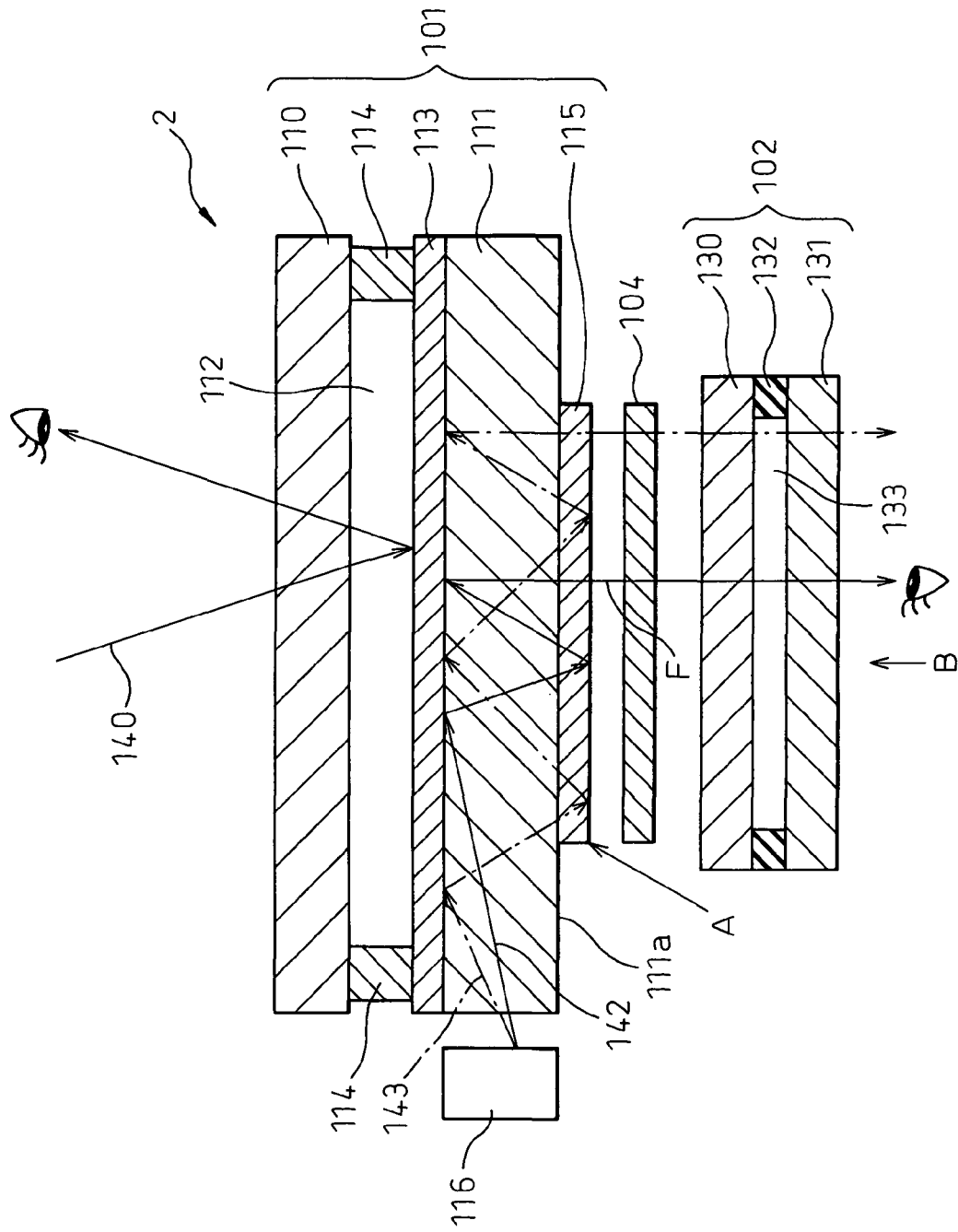
FIG. 9 is a simplified cross-sectional view of the display apparatus shown in FIG. 8.

FIG. 8 is a perspective view of a display apparatus 2 according to a second embodiment of the present invention, and FIG. 9 is a simplified cross-sectional view thereof.

In the display apparatus 2, the first display panel 101 is identical in structure to that of the display apparatus 1 described above. The display apparatus 2 differs from the display apparatus 1 by the inclusion of a second display panel 102 and a layer of a light control member 104.

As shown in FIGS. 8 and 9, the display apparatus 2 includes the first display panel 101 as one display panel, the second display panel 102 as the other display panel which is an illuminated member, and the light control member 104 formed from a prism sheet or the like. The prism sheet has the function of causing incident light to emerge as light having prescribed directivity.

As shown in FIGS. 8 and 9, the first display panel 101 is a reflective monochrome liquid crystal display panel (or may be a color liquid crystal display panel), and includes a first transparent substrate 110 on the viewer side, a second transparent substrate 111 on the illumination side, and a liquid crystal layer 112. The first transparent substrate 110 is formed from a glass plate on which a first electrode made of a transparent electrode material ITO and an alignment film (neither shown here) are formed. The second transparent substrate 111 is formed from a glass plate on which are formed a reflective layer 113 made of aluminum, a protective layer made of an acrylic-based material (not shown), a second electrode made of a transparent electrode material ITO (in the case of an STN liquid crystal display, electrodes formed in a stripe pattern and, in the case of an active liquid crystal display, active devices and display electrodes) (not shown), and an alignment film deposited on the liquid crystal side of the electrode. The first display panel 101 of the display apparatus 2 is constructed as an STN liquid crystal display.

The first transparent substrate 110 and the second transparent substrate 111 are attached together along their peripheries by means of a seal material 114, and the liquid crystal layer 112 is provided between them.

Further, as shown in FIG. 9, a light control layer 115 formed from a prism sheet or the like is directly fixed to the outside surface of the second transparent substrate 111 (i.e., the surface that faces the second display panel 102). The area size of the light control layer 115 is approximately equal to that of the display area of the second display panel 102. Accordingly, the second transparent substrate 111 has a portion 111a (see FIG. 3) where the light control layer 115 is not formed.

As shown in FIGS. 5 and 6, the light control layer 115 is formed by attaching a 100-µm thick prism sheet 117 to the glass used as the transparent substrate 111 by means of an acrylic-based adhesive. Grooves 115A, each 20 µm deep, are formed at a pitch of 300 µm on the surface of the prism sheet 117. Each groove 115A is formed in the shape of a scalene triangle, and has two sloping faces 115B and 115C. Here, the prism sheet thickness and the groove depth and pitch are not limited to the above specific values but can be changed to other optimum values as needed.

As shown in FIG. 9, the light source 116 is disposed in close proximity to an end face of the second transparent substrate 111. The light source 116 is constructed from an array of a plurality of LEDs, and is designed so that the light from the LEDs is directed via a diffusing plate into the second transparent substrate 111 which has a light-guide function. In an alternative design of the light source 116, a linear (square rod-like) light-guide member is placed so as to face the end face of the second transparent substrate 111, LEDs as light sources are disposed adjacent to opposite longitudinal ends of the linear light-guide member, and the light is guided through the linear light guide so that the light emerges from one longitudinal face of the linear light-guide member.

With this design, the light source 116 can project light with a relatively uniform brightness distribution onto the glass end face, and the brightness distribution of the light emergent from the light control layer 115 can be made further uniform.

In the first display panel 101, the second transparent substrate 111 functions as a transparent substrate having a light-guide function. The second transparent substrate 111, the reflective layer 113, the light control layer 115, and the light source 116 together constitute an illuminating means for illuminating the second display panel 102 which is an illuminated member.

The second display panel 102 is a transmissive color liquid crystal display panel (or may be a monochrome liquid crystal display panel), and comprises a third transparent substrate 130, a fourth transparent substrate 131, and a seal member 132 for sealing a liquid crystal layer 133 between the third and fourth transparent substrates 130 and 131. Color filters (not shown) are provided on the surface of the third transparent substrate 130 that faces the liquid crystal layer 133, and polarizers (not shown) are provided on the front surface of the third transparent substrate 130 and the back surface of the fourth transparent substrate 131, respectively. Further, though not shown here, a transparent electrode (not shown) is formed on the surface of the third transparent substrate 130 that faces the liquid crystal layer 133, and electrodes in a stripe pattern, in the case of an STN liquid crystal display, or active devices and display electrodes, in the case of an active liquid crystal display, are formed on the surface of the fourth transparent substrate 131 that faces the liquid crystal layer 133. In the display apparatus 2, the second display panel 102 is constructed as an STN liquid crystal display.

Next, the operation of the display apparatus 2 according to the present invention will be described with reference to FIG. 9. In FIG. 9, reference numeral 140 indicates the path of the light provided by an external light source, and 142 and 143 each indicate the path of the light emitted from the light source 116.

The method of display on the first display panel 101 will be described. When the amount of external light is relatively large, the display can be produced by utilizing the external light. The operation for this case will be described by referring to the external light 140. The external light 140 enters the liquid crystal layer 112 by passing through the first transparent substrate 110 of the first display panel 101. After that, the light is reflected by the reflective layer 113 back into the first transparent substrate 110 on the incident side by taking a path similar to the path it entered.

Here, the first display panel 101 can be set so that, when viewed from the viewer side, the display appears dark (black), for example, when no voltage is applied between the electrodes formed on the first and second transparent electrode substrates 110 and 111. In this case, a bright (white) display state can be produced by applying a voltage between the electrodes from an external circuit so as to cause a potential difference between the electrodes and thereby providing a potential difference between both ends of the liquid crystal layer 112.

Next, the method of display on the second display panel 102 will be described.

The operation when the light source 116 is turned on will be described. The light 142 emitted from the light source 116 and introduced into the second transparent substrate 111 is reflected by the light reflective layer 113, and enters the light control layer 115 by passing through the second transparent substrate 111.

The light entering the light control layer 115 is reflected by the sloping face 115B of the groove 115A and, with its direction of reflection changed upon reflection, reenters the second transparent substrate 111, as shown in FIGS. 4 and 9. The light that reentered the second transparent substrate 111 is again reflected by the light reflective layer 113 back into the second transparent substrate 111, passes through the light control layer 115, and emerges as illuminating light F for illuminating the second display panel 102.

The illuminating light F becomes brighter by passing through the prism sheet 104. The light then passes through the third transparent substrate 130 of the second display panel 102, enters the liquid crystal layer 133, and passes through the fourth transparent substrate 131.

The second display panel 102 can be set so that, when viewed from the viewer side, the display appears dark (black), for example, when no voltage is applied between the electrodes formed on the third and fourth transparent electrode substrates 130 and 131. In this case, a bright (white) display state can be produced by applying a voltage between the electrodes from an external circuit so as to cause a potential difference between the electrodes and thereby providing a potential difference between both ends of the liquid crystal layer 133.

On the other hand, the light 143 shown in FIG. 9 is the light that is emitted from the light source 116 and that would normally emerge from the second transparent substrate 111 of the first display panel in the direction of the first transparent substrate 110 formed above it, but as shown in FIG. 4, when the light 143 is incident on the sloping face 115C of the groove 115A, it is reflected at the sloping face 115B and then reflected by the light reflective layer 113 and emerges in the direction of the second display panel 102. On the first reflection, as the incidence angle of the light 143 is shallow, the light 143 is totally reflected within the second transparent substrate 111 and does not exit from it.

In the display apparatus 2 according to the present invention, when the light source 116 is turned on, light emitted from the light source 116 enters the second transparent substrate 111 of the first display panel 101, is reflected by the light reflective layer 113 back into the second transparent substrate 111, and enters the light control layer (prism sheet) 115. The light entering the light control layer 115 is reflected at the interface between the air and the light control layer 115 while changing its angle of emergence, and reenters the second transparent substrate 111. The light that reentered the second transparent substrate 111 is again reflected by the light reflective layer 113 back into the second transparent substrate 111, and the reflected light passes through the light control layer 115, further passes through the third transparent substrate 130 of the second display panel 102, enters the liquid crystal layer 133, and passes through the fourth transparent substrate 131.

Here, the second display panel 102 can be set so that, when viewed from the viewer side, the display appears dark (black), for example, when no voltage is applied between the electrodes formed on the third and fourth transparent electrode substrates 130 and 131. In this case, a bright (white) display state can be produced by applying a voltage between the electrodes from an external circuit so as to cause a potential difference between the electrodes and thereby providing a potential difference between both ends of the liquid crystal layer 133.

As the first display panel 101 includes the illuminating means as described above, the first display panel 101 can, by itself, produce illuminating light for illuminating the second display panel 102 without using any backlight device. In this way, the display apparatus 2 according to the present invention obviates the need for a backlight device, and the thickness of the display apparatus can be correspondingly reduced.

Further, as can be seen from FIGS. 3 and 9, since the light emitted from the light source 116 and introduced into the second transparent substrate 111 is substantially prevented from exiting from the portion where the light control layer 15 is not formed (the portion 111a not covered by the light control layer 115), the light can be effectively utilized. In other words, even if the size of the second display panel 102 is smaller than that of the first display panel 101, since little light exits from the portion other than the intended portion, the utilization efficiency of the light for illuminating the second display panel 102 can be enhanced.

In the display apparatus 2 according to the present invention, the first display panel 101 is constructed as a monochrome display and the second display panel 102 as a color display, but alternatively, the first display panel 101 may be constructed as a color display and the second display panel 102 as a monochrome display, or both the first display panel 101 and the second display panel 102 may be constructed as color displays, or both the first display panel 101 and the second display panel 102 may be constructed as monochrome displays. In these alternative examples also, the same effect as that achieved by the display apparatus 2 according to the present invention can be obtained.

Further, in the display apparatus 2 according to the present invention, the light control layer 115 has been formed by attaching the prism sheet 117, 100 μm thick, to the second transparent substrate 111 by means of an acrylic-based adhesive, as shown in FIG. 6. Alternatively, as shown in FIG. 7, the light control layer 115 may be formed on the second transparent substrate 111 in integral fashion by using a mold. Further alternatively, the light control layer 115 may be formed on the second transparent substrate 111 (a glass or plastic member) by cutting, etching, or other suitable means.

In the display apparatus 2 according to the present invention, the first display panel 101 and the second display panel 102 are both constructed as STN liquid crystal display panels, but alternatively, both may be constructed as active liquid crystal display panels, or one of the display panels may be constructed as an STN panel and the other as an active panel. In these alternative examples also, the same effect as that achieved by the display apparatus 2 according to the present invention can be obtained.

Figure 10:
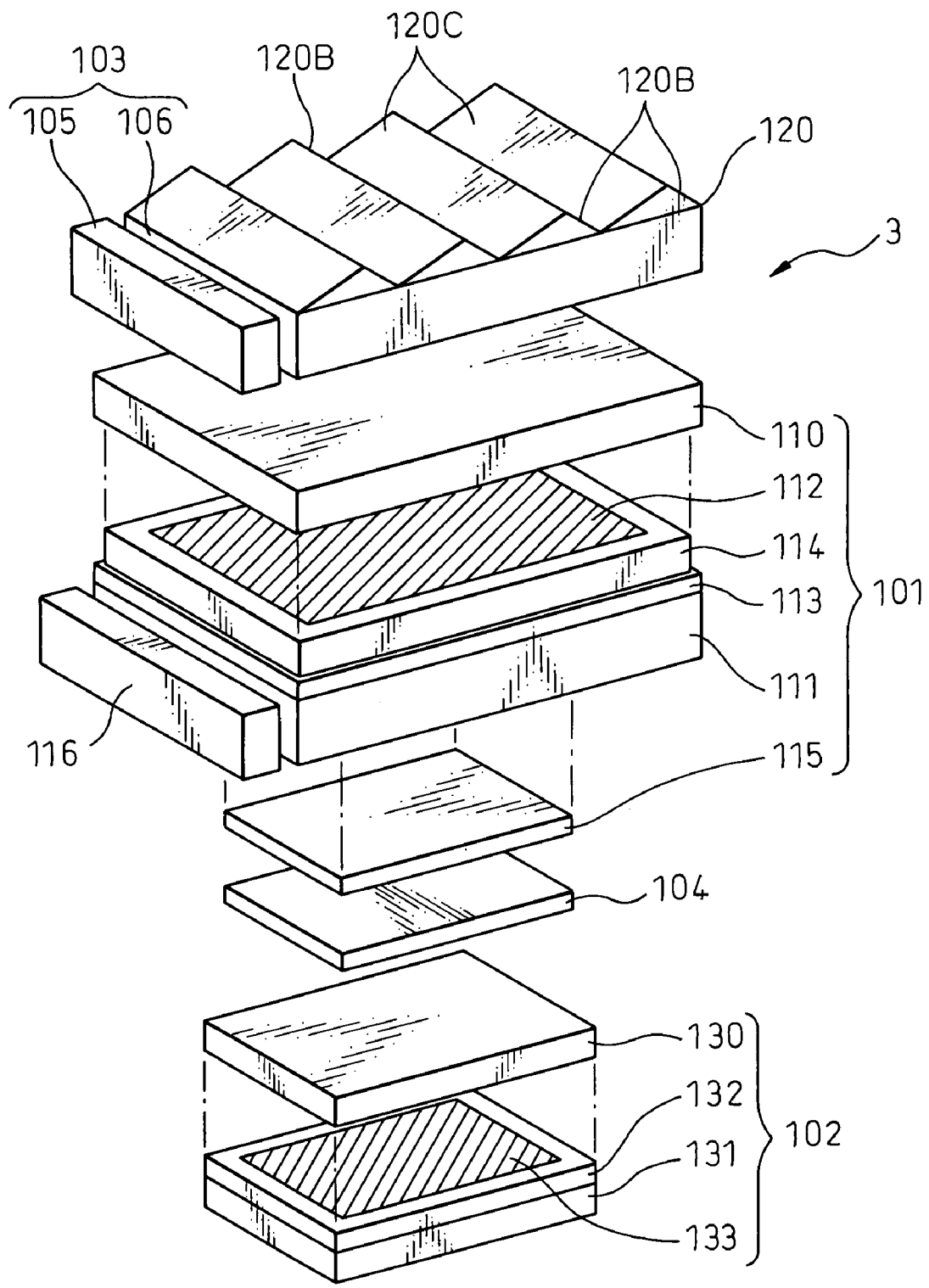
FIG. 10 is a perspective view of a display apparatus according to a third embodiment of the present invention.
Figure 11:
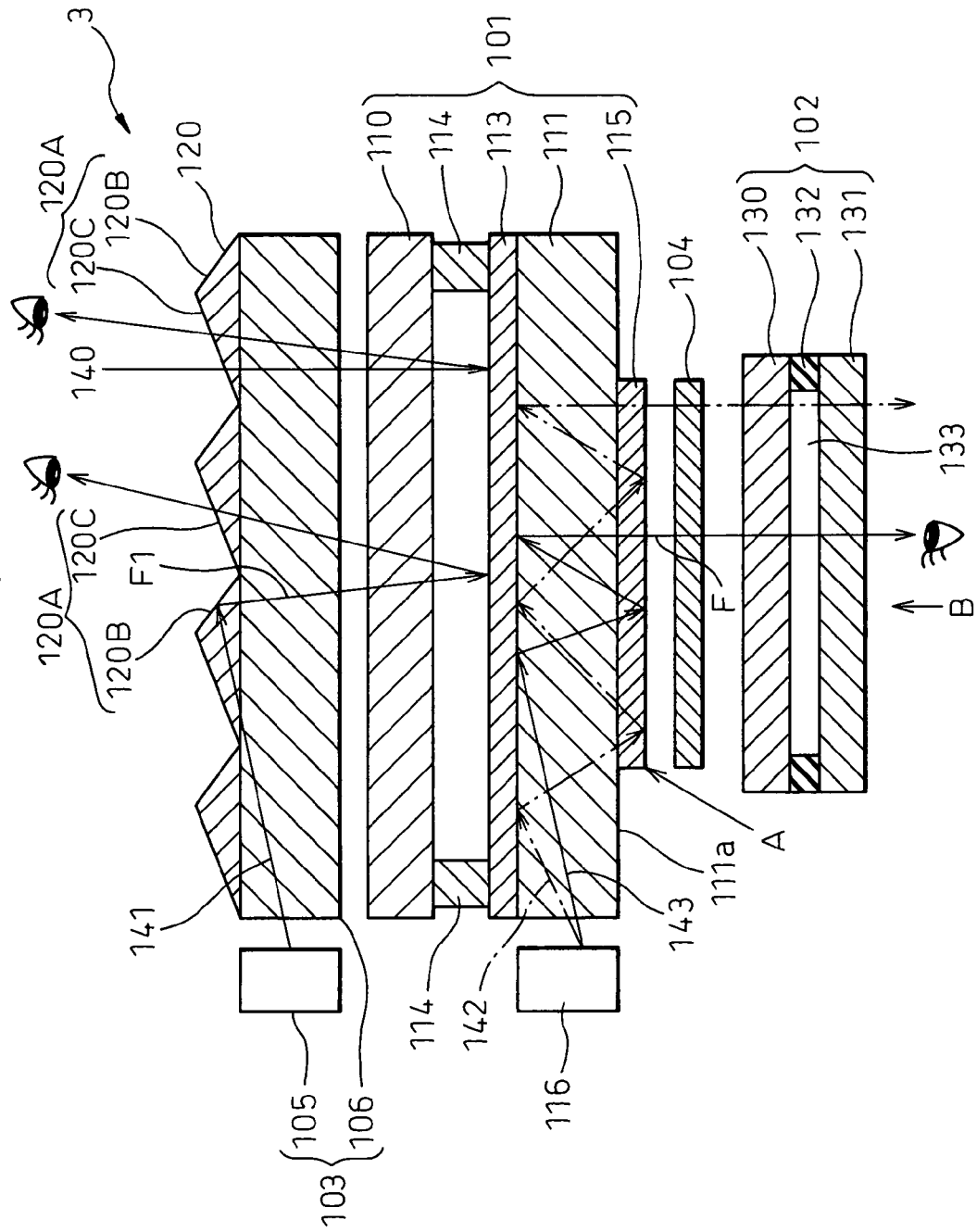
FIG. 11 is a simplified cross-sectional view of the display apparatus shown in FIG. 10.

FIG. 10 is a perspective view of a display apparatus 3 according to a third embodiment of the present invention, and FIG. 11 is a cross-sectional view thereof.

As shown in FIGS. 10 and 11, the display apparatus 3 includes a first display panel 101, a second display panel 102, a prism sheet 104, and a front light 103 disposed on the viewer side of the first display panel 101.

The first display panel 101, the second display panel 102, and the prism sheet 104 are identical in structure to those in the display apparatus 2 described above in accordance with the present invention, and therefore, these elements are designated by the same reference numerals and will not be described in detail herein.

The front light 103 includes a light source 105 and a light-guide plate 106 as a light-guide member. The area size of the light-guide plate 106 is approximately equal to that of the display area of the first display panel 101.

A light control layer 120 is provided over the entire area of the viewer side (the upper side in the figure) of the light-guide plate 106. The light control layer 120 is formed, for example, by attaching a 100-μm thick prism sheet 118 to the glass or plastic member used as the light guide plate 106 by means of an acrylic-based adhesive.

Figure 12:
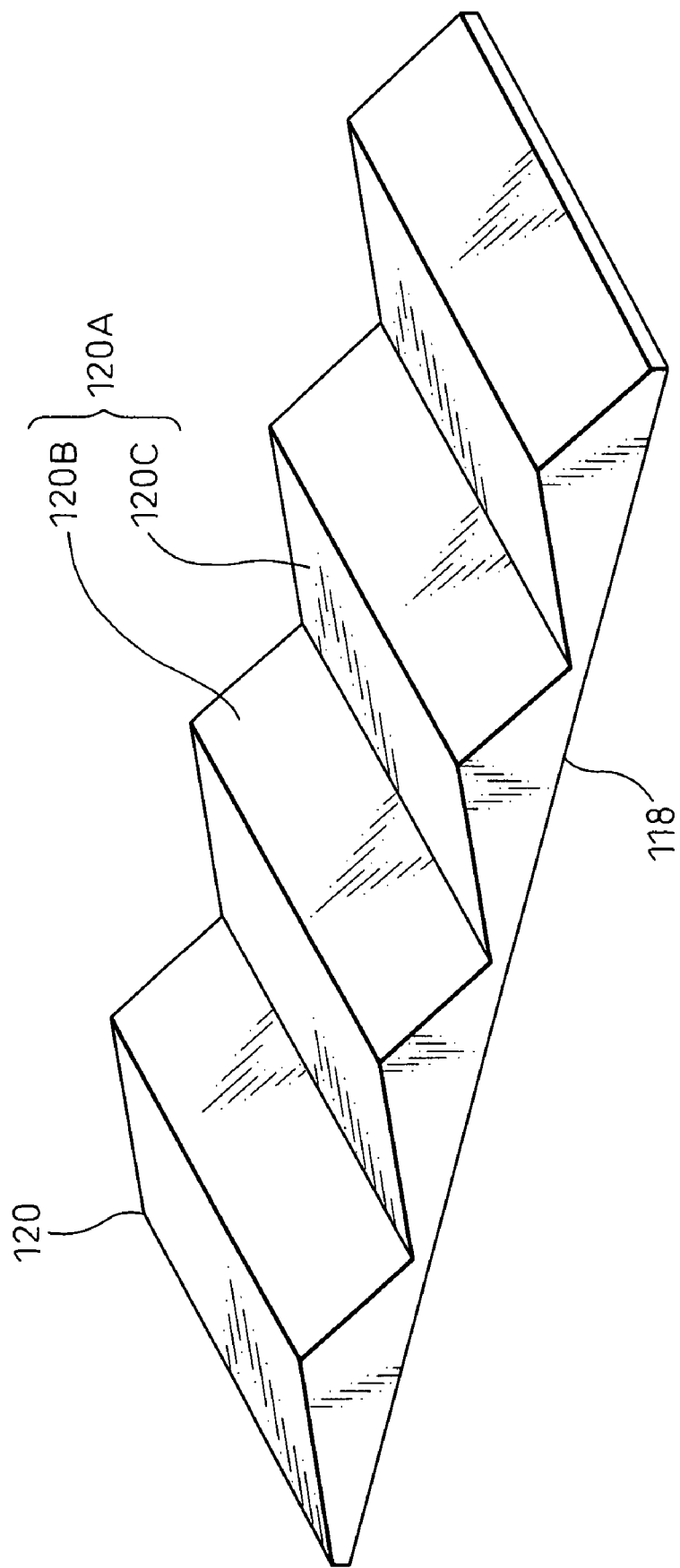
FIG. 12 is a perspective view of a prism sheet used in a front light.

As shown in FIG. 12, grooves 120A, each 20 μm deep, are formed at a pitch of 300 μm on the surface of the prism sheet 118. Each groove 120A is formed in the shape of a scalene triangle, and has two sloping faces 120B and 120C. Here, the prism sheet thickness and the groove depth and pitch are not limited to the above specific values but can be changed to other optimum values as needed.

As shown in FIG. 11, the light source 105 is disposed in close proximity to an end face of the light-guide plate 106. The light source 105 is constructed from an array of a plurality of LEDs, and is designed so that the light from the LEDs is directed via a diffusing plate into the light-guide plate 106. Here, the light source may be constructed from a single LED. In an alternative design of the light source 105, a linear (square rod-like) light-guide member is placed so as to face the end face of the light-guide plate 106, LEDs as light sources are disposed adjacent to opposite longitudinal ends of the linear light-guide member, and the light is guided through the linear light guide so that the light emerges from one longitudinal face of the linear light-guide member.

With this design, the light source 105 can project light with a relatively uniform brightness distribution onto the glass end face, and the brightness distribution of the light emergent from the light control layer 120 can be made move uniform.

Next, the operation of the display apparatus 3 according to the present invention will be described with reference to FIG. 11. In FIG. 11, external light 140 incident from outside the display apparatus 3 indicates the path of the light from the outside, and light 141 indicates the path of the light emitted from the light source 105. Further, reference numerals 142 and 143 each indicate the path of the light emitted from the light source 116.

The method of display on the first display panel 101 will be described.

When the amount of external light is relatively large, the display can be produced by utilizing the external light. The operation for this case will be described by referring to the external light 140. The external light 140 incident on the light control layer 120 passes through the light-guide plate 106, and enters the liquid crystal layer 112 by passing through the first transparent substrate 110 of the first display panel 101. After that, the light is reflected by the reflective layer 113 and returns to the light control layer 120 on the incident side by taking a path similar to the path it entered.

Here, the display panel can be set so that, when viewed from the viewer side, i.e., the upper side in FIG. 11, the display appears dark (black), for example, when no voltage is applied between the electrodes formed on the first and second transparent electrode substrates 110 and 111. In this case, a bright (white) display state can be produced by applying a voltage between the electrodes from an external circuit so as to cause a potential difference between the electrodes and thereby providing a potential difference between both ends of the liquid crystal layer 112.

Next, referring to FIGS. 11 and 12, a description will be given of the operation for producing a display by turning on the light source 105 of the front light when the amount of external light is low (in a low-light environment).

The light 141 emitted from the light source 105 enters the light-guide plate 106, is reflected by the sloping face 120B of the groove 120A of the light control layer 120, reenters the light guide plate 106, and emerges as illuminating light F1 for illuminating the first display panel 101.

The illuminating light F1 enters the liquid crystal layer 112 by passing through the first transparent substrate 110 of the first display panel 101, and is reflected by the light reflective layer 113. The reflected light then passes through the liquid crystal layer 112 and through the first transparent substrate 110, enters the light-guide plate 106, passes through the light control layer 120, and emerges on the viewer side.

Here, the display panel can be set so that, when viewed from the viewer side, i.e., the upper side in FIG. 11, the display appears dark (black), for example, when no voltage is applied between the electrodes formed on the first and second transparent electrode substrates 110 and 111. In this case, a bright (white) display state can be produced by applying a voltage between the electrodes from an external circuit so as to cause a potential difference between the electrodes and thereby providing a potential difference between both ends of the liquid crystal layer 112.

Next, the operation for producing a display on the second display panel 102 will be described for the case where the light source 116 is turned on.

The light 142 emitted from the light source 116 and introduced into the second transparent substrate 111 is reflected by the light reflective layer 113, and enters the light control layer 115 by passing through the second transparent substrate 111.

As shown in FIG. 11, the light entering the light control layer 115 is reflected by the sloping face 115B of the groove 115A of the light control layer 115 and reenters the second transparent substrate 111, as previously shown in FIG. 4. The light is then reflected again by the light reflective layer 113 back into the second transparent substrate 111, passes through the light control layer 115, and emerges as illuminating light F for illuminating the second display panel 102.

The illuminating light F becomes brighter by passing through the prism sheet 104. The light then passes through the third transparent substrate 130 of the second display panel 102, enters the liquid crystal layer 133, and passes through the fourth transparent substrate 131.

Here, the second display panel 102 can be set so that, when viewed from the viewer side, the display appears dark (black), for example, when no voltage is applied between the electrodes formed on the third and fourth transparent electrode substrates 130 and 131. In this case, a bright (white) display state can be produced by applying a voltage between the electrodes from an external circuit so as to cause a potential difference between the electrodes and thereby providing a potential difference between both ends of the liquid crystal layer 133.

On the other hand, the light 143 shown in FIG. 11 is the light that is emitted from the light source 116 and that would normally emerge from the second transparent substrate 111 of the first display panel in the direction of the light reflective layer 113 formed thereon, but since the incidence angle of the light 143 is shallow, the light 143 is reflected within the second transparent substrate 111 and little light exits from it.

As described above, in the display apparatus 3 according to the present invention, when the amount of external light is relatively large, the external light 140 incident on the light control layer 120 passes through the light-guide plate 106 and enters the first display panel 101. After that, the light is reflected by the reflective layer 113 and returns to the light control layer 120 on the incident side by taking a path similar to the path it entered, and the light is thus viewed on the viewer side.

Further, in the display apparatus 3 according to the present invention, when the amount of external light is low (in a low-light environment), the light source 105 of the front light 103 is turned on. The light 141 from the light source 105 enters the light-guide plate 106 and is introduced via the light-guide plate 106 into the light control layer 120 where the light is reflected by the face of the light control layer 120. The reflected light reenters the light-guide plate 106 and is introduced into the first display panel 101. The light introduced into the first display panel 101 is reflected by the reflective layer 113 and returns to the light control layer 120 on the incident side by taking a path similar to the path it entered, and the light is thus viewed on the viewer side. In this way, the utilization efficiency of the light is enhanced.

It will therefore be appreciated that the display apparatus 3 according to the present invention also offers the same effect as that achieved by the display apparatus 1 or 2 according to the present invention earlier described.

Figure 13:
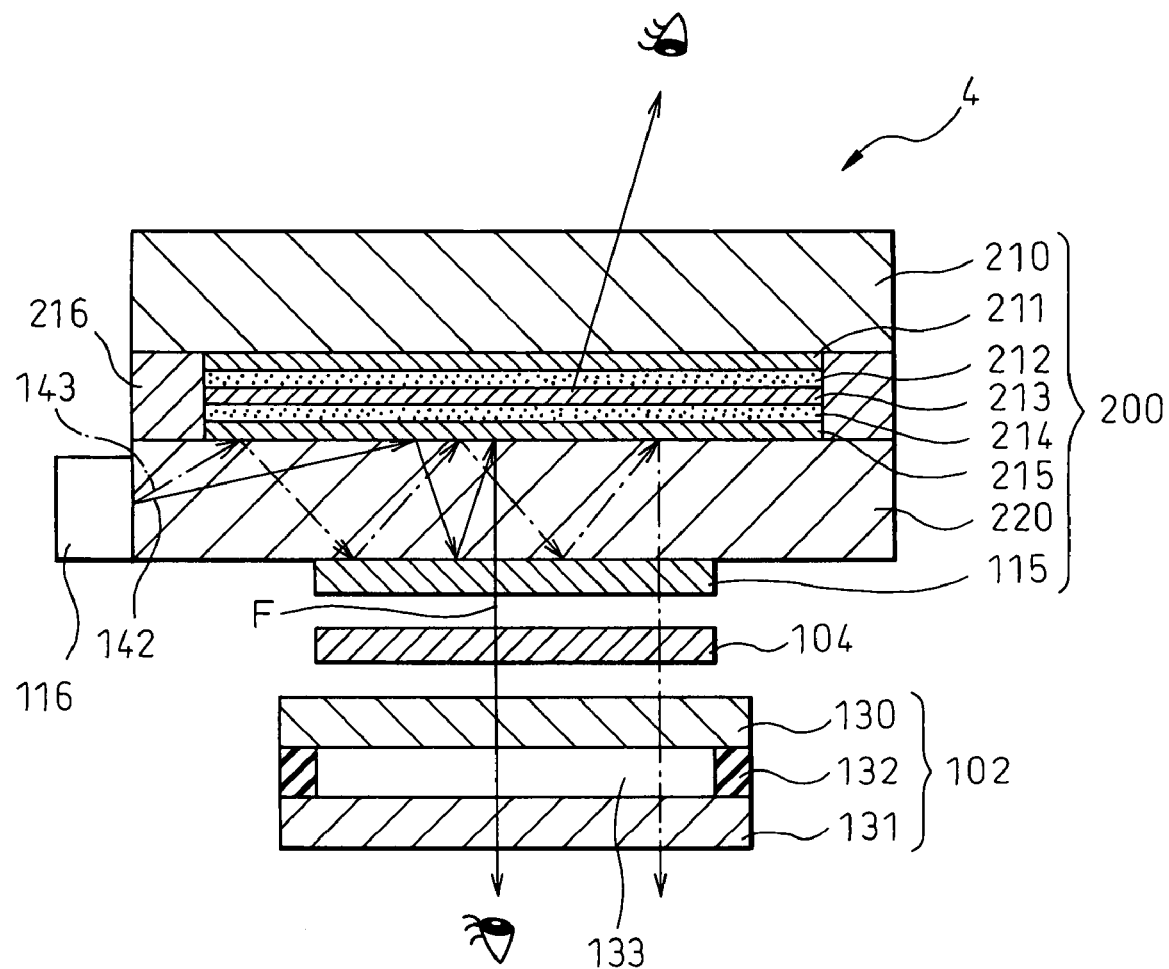
FIG. 13 is a simplified cross-sectional view of a display apparatus according to a fourth embodiment of the present invention.

FIG. 13 is a simplified cross-sectional view of a display apparatus 4 according to a fourth embodiment of the present invention.

The display apparatus 4 shown in FIG. 13 differs from the display apparatus 2 shown in FIG. 9 in that the display apparatus 4 includes, instead of the display panel 101, an organic EL display 200 having a light control layer 115. The light source 116, light control member 104, and second display panel 102 in the display apparatus 4 are the same as those in the display apparatus 2, and therefore, the description of these components will not be repeated here.

The organic EL display 200 includes a first transparent substrate 210 disposed on the viewer side, a positive electrode (ITO) formed on the first transparent substrate 210, a hole transporting layer 212, a light-emitting layer 213, an electron transport layer 214, a negative electrode 214, and a second transparent substrate 220. In the organic EL display 200, holes injected from the positive electrode 211 and electrons injected from the negative electrode 214 recombine in the light-emitting layer 213, exciting organic molecules to produce light.

The negative electrode 214 of the organic EL display 200 is constructed so that it also functions as a metallic mirror in order to increase brightness by reflecting the light emitted from the light-emitting layer 213 back to the viewer side. For the light 142 and 143 emitted from the light source 116, the negative electrode 214 has a function equivalent to that of the reflective layer 113 shown in FIG. 9. Accordingly, the light source 116, the second transparent substrate 220 of the organic EL display 200, and the light control layer 115 together function as an illuminating means for illuminating the second display panel 102 as in the case of the display apparatus 2.

Thus, in the display apparatus 4 according to the present invention, as the organic EL display 200 includes the illuminating means, the organic EL display 200 can, by itself, produce illuminating light for illuminating the second display panel 102 without using any backlight device. In this way, the display apparatus 4 according to the present invention obviates the need for a backlight device, and the thickness of the display apparatus can be correspondingly reduced.

Figure 14:
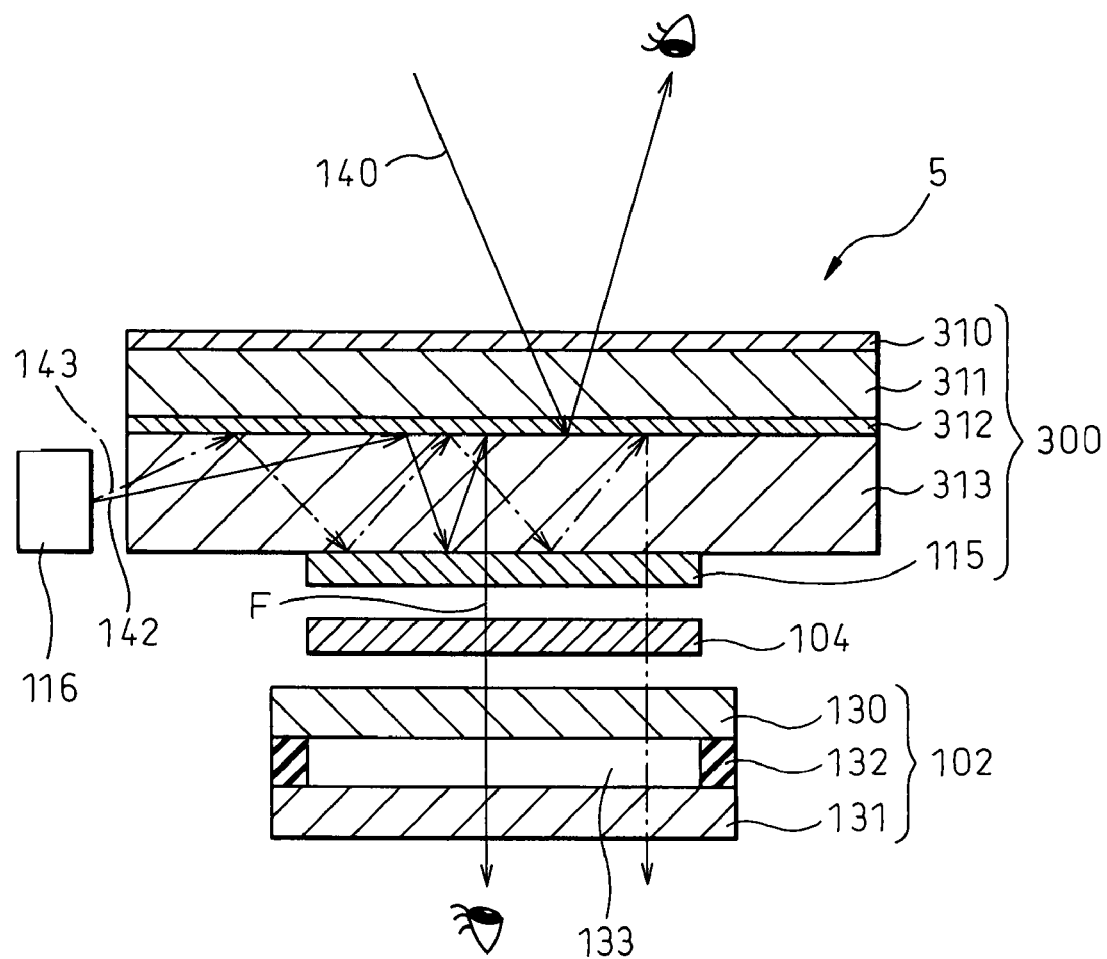
FIG. 14 is a simplified cross-sectional view of a display apparatus according to a fifth embodiment of the present invention.

FIG. 14 is a simplified cross-sectional view of a display apparatus 5 according to a fifth embodiment of the present invention.

The display apparatus 5 shown in FIG. 14 differs from the display apparatus 2 shown in FIG. 9 in that the display apparatus 5 includes, instead of the display panel 101, a microencapsulated electrophoretic display 300 having a light control layer 115. The light source 116, light control member 104, and second display panel 102 in the display apparatus 5 are the same as those in the display apparatus 2, and therefore, the description of these components will not be repeated here.

The microencapsulated electrophoretic display 300 includes a transparent cover 310 disposed on the viewer side, a first transparent substrate 310 having a first transparent electrode, an encapsulated ink layer 312, and a second transparent substrate 313 having a second transparent electrode. The microencapsulated electrophoretic display 300 produces a display by causing oppositely charged encapsulated inks of different colors (white and black) to be attracted to the first transparent electrode or the second transparent electrode in a selective fashion.

In the microencapsulated electrophoretic display 300, which produces a display by using external light 140, the second electrode is constructed so that it also functions as a metallic mirror. For the light 142 and 143 emitted from the light source 116, the second electrode has a function equivalent to that of the reflective layer 113 shown in FIG. 9. Accordingly, the light source 116, the second substrate 313 of the microencapsulated electrophoretic display 300, and the light control layer 115 together function as an illuminating means for illuminating the second display panel 102 as in the case of the display apparatus 2.

Thus, in the display apparatus 5 according to the present invention, as the microencapsulated electrophoretic display 300 includes the illuminating means, the microencapsulated electrophoretic display 300 can, by itself, produce illuminating light for illuminating the second display panel 102 without using any backlight device. In this way, the display apparatus 5 according to the present invention obviates the need for a backlight device, and the thickness of the display apparatus can be correspondingly reduced.

In the foregoing, the display apparatus that uses a display panel other than a liquid crystal panel, that is, an organic EL display 200 (see FIG. 13) or a microencapsulated electrophoretic display 300 (see FIG. 14), respectively, has been described. However, the present invention can also use other types of display, as long as the display has a reflective layer and a transparent substrate and can function as an illuminating device for illuminating the other display panel. For example, an "Electro Liquid Powder" display or an FED (Field Emission Display) may be used in place of the first display panel 101 in the display apparatus 2 shown in FIG. 9. Here, the "Electro Liquid Powder" display is a display device that can form an image by using two-color "Electro Liquid Powder," a material having properties intermediate between those of particles and liquids, provided between two electrodes. The FED is a so-called electron-emission display.

Figure 15:
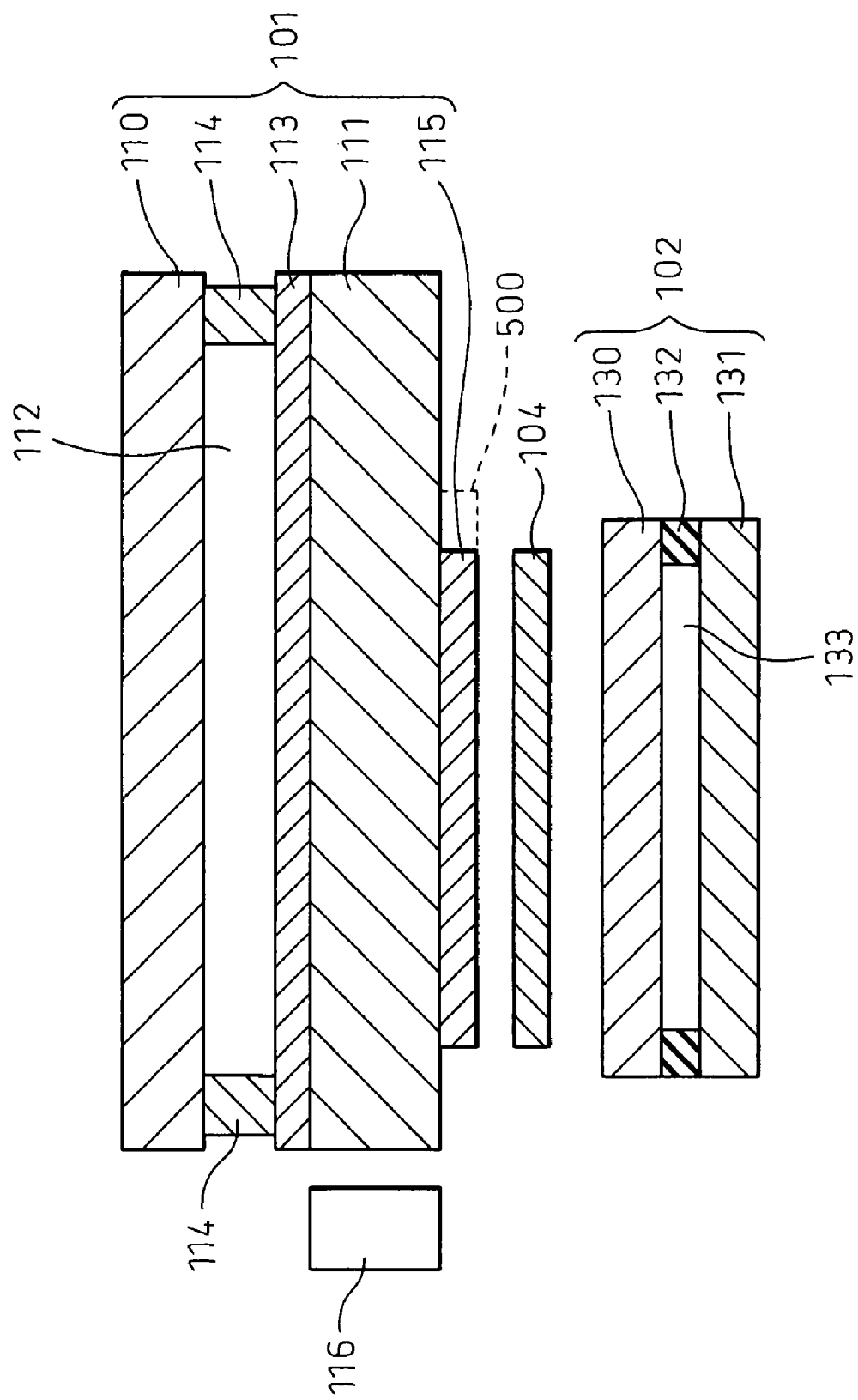
FIG. 15 is a diagram for explaining the function of a light control layer.
Figure 16:
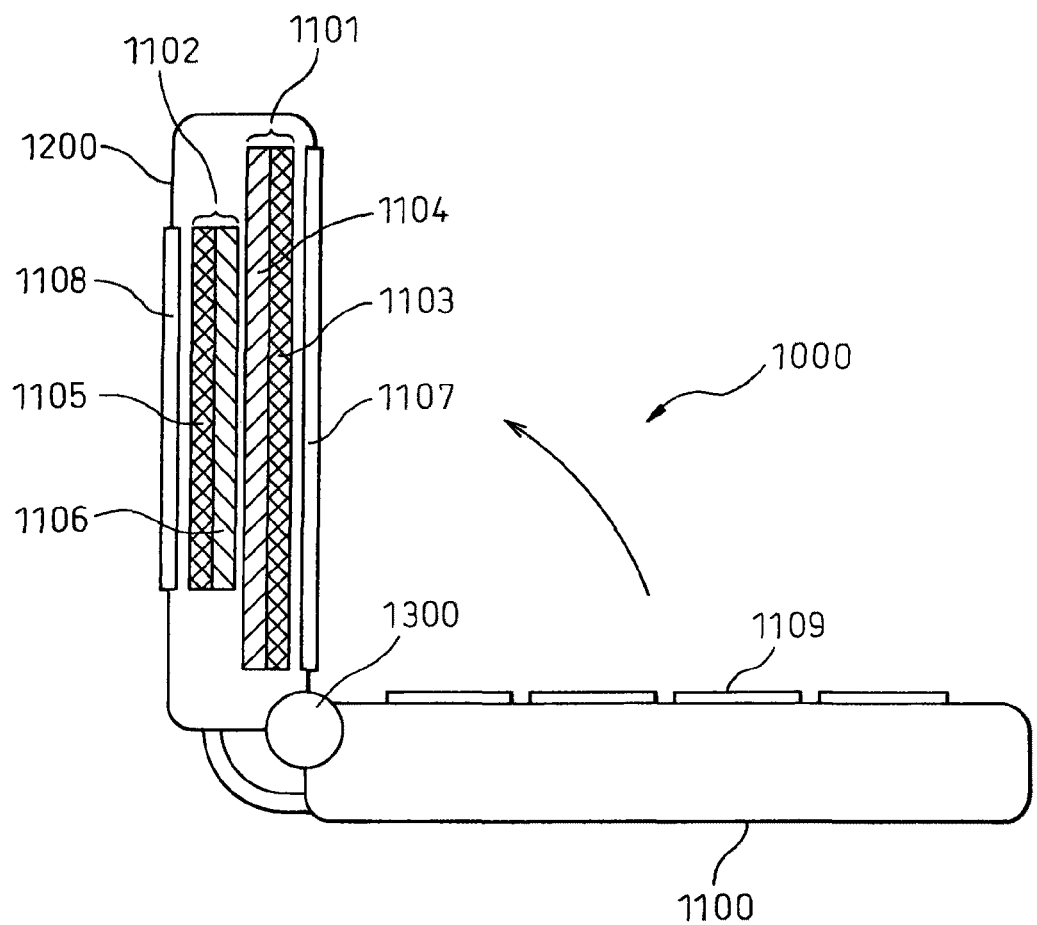
FIG. 16 is a diagram for explaining the construction of a mobile phone.
Figure 17:
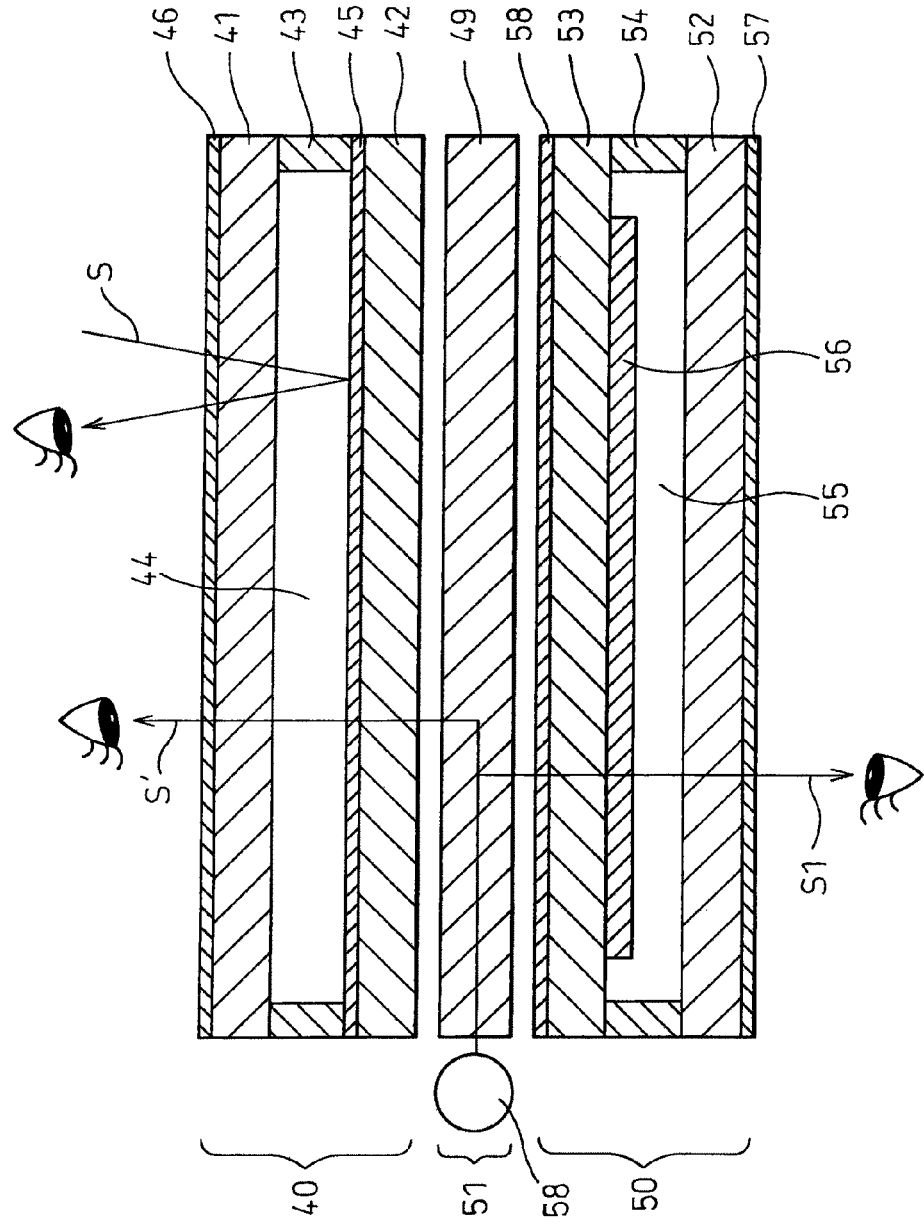
FIG. 17 is a cross-sectional view of a double-sided liquid crystal display apparatus according to the prior art.
Figure 18:
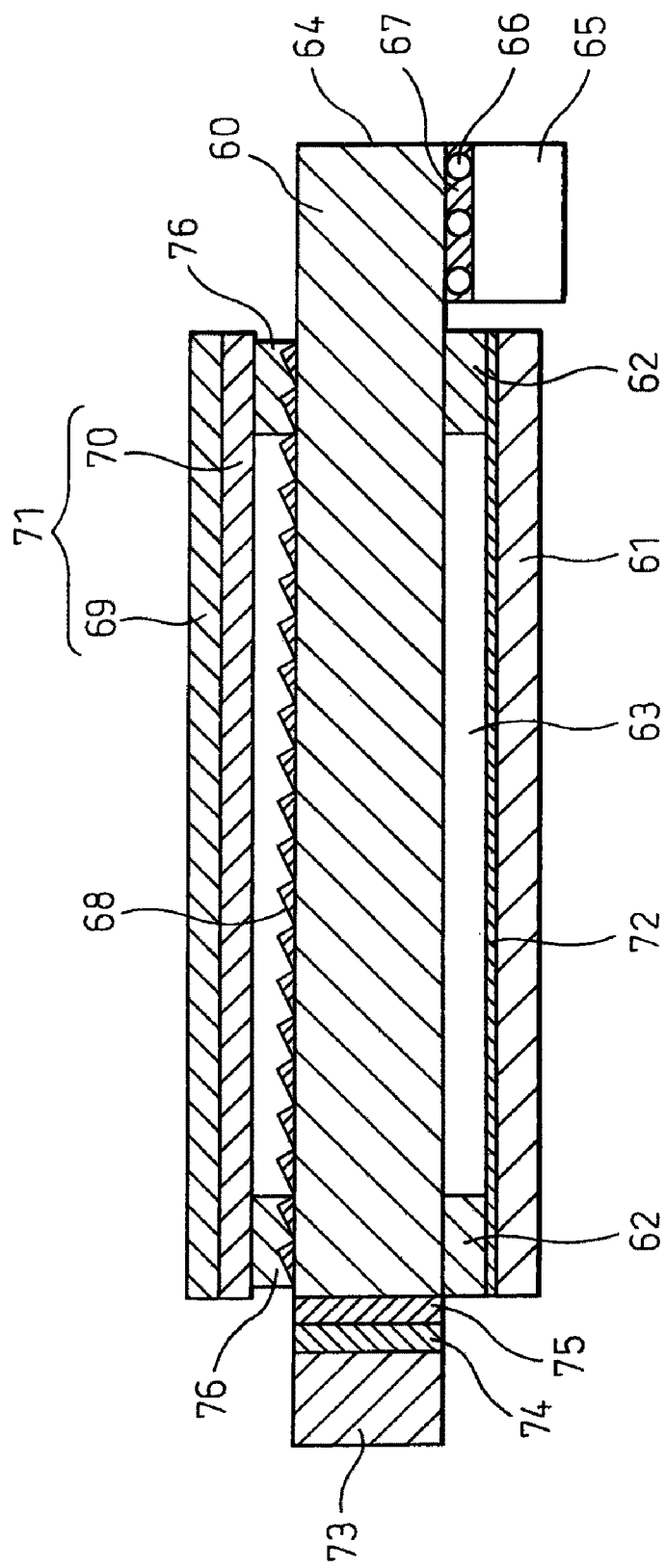
FIG. 18 is a cross-sectional view of a liquid crystal display apparatus according to the prior art.

FIG. 15 is a diagram for explaining the function of the light control layer 115.

The only difference between FIG. 15 and the display apparatus 2 shown in FIG. 9 is that the light control layer 115 is shifted to the left in the plane of the figure from the position shown in FIG. 9 (the position indicated at 500 in FIG. 15) and the light control member 104 and the second display panel 102 are shifted to match the shifted position of the light control layer 115.

As earlier described, the light emitted from the light source 116 and introduced into the second transparent substrate 111 is reflected within the second transparent substrate 111 and can hardly exit from it in the portion other than the portion where the light control layer 115 is formed, because the incidence angle of the light is shallow. Accordingly, the portion (area) where the light is to emerge from the second transparent substrate 111 can be determined freely by the design of the light control layer 115. This offers the advantage of being able to increase design freedom in terms of the size and position of the second display panel.

The above example has shown the case where the position of the light control layer 115 is shifted in the display apparatus 2 according to the present invention. It will, however, be recognized that, in the display apparatus 1 and 3 to 5 according to the present invention also, the same effect can be obtained by shifting the position of the light control layer 115.

In the display apparatus according to the present invention, since one display panel includes the illuminating means, the one display panel can, by itself, produce illuminating light for illuminating the other display panel without using any backlight device. In this way, the display apparatus according to the present invention obviates the need for a backlight device, and the thickness of the display apparatus can be correspondingly reduced. As a result, the display apparatus according to the present invention is advantageous for use as a double-sided display apparatus in which two display panels are arranged back to back relative to each other so that each display panel can present a display for viewing by the viewer.

What is claimed is:

1. A double-sided display apparatus comprising:
   a first display panel having a first transparent substrate, a second transparent substrate, a first liquid crystal layer directly sealed between said first and second transparent substrates, and a reflective layer disposed between said second transparent substrate and said first liquid crystal layer;
   a second display panel; and
   a light source for emitting light which is directly introduced into said second transparent substrate of said first display panel,
   wherein the light introduced into said second transparent substrate from said light source is reflected by said reflective layer and illuminates said second display panel.

2. The double-sided display apparatus according to claim 1, further comprising a light control layer provided on said second transparent substrate on a side thereof facing said second display panel, and wherein the light introduced into said second transparent substrate from said light source is reflected by said reflective layer and illuminates said second display panel via said light control layer.

3. The double-sided display apparatus according to claim 2, wherein said light control layer is attached directly to said second transparent substrate.

4. The double-sided display apparatus according to claim 2, wherein said light control layer is integrally formed with said second transparent substrate.

5. The double-sided display apparatus according to claim 2, wherein said light control layer is approximately equal in size to a display area of said second display panel.

6. The double-sided display apparatus according to claim 1, further comprising a prism sheet disposed between said light control layer and said second display panel.

7. The double-sided display apparatus according to claim 1, further comprising a front light, disposed outside said first transparent substrate, for illuminating said first liquid crystal panel.

8. The double-sided display apparatus according to claim 1, wherein said first display panel is an organic EL display, a microencapsulated electrophoretic display, an electro liquid powder display, or an electron-emission display.

9. The double-sided display apparatus according to claim 1, wherein said light source is disposed adjacent to an end face of said second transparent substrate.

10. The double-sided display apparatus according to claim 1, wherein said second display panel is a liquid crystal display panel having a third transparent substrate, a fourth transparent substrate, and a second liquid crystal layer provided between said third and fourth transparent substrates.

11. The double-sided display apparatus according to claim 1, wherein said first display panel and said second display panel are disposed back to back.

* * * * *